US012609550B2

(12) United States Patent
McBride et al.

(10) Patent No.: US 12,609,550 B2
(45) Date of Patent: Apr. 21, 2026

(54) BATTERY CHARGING DEVICE FOR CHARGING A DEEPLY DISCHARGED BATTERY, AND BATTERY CHARGING SYSTEM AND METHOD

(71) Applicant: THE NOCO COMPANY, Glenwillow, OH (US)

(72) Inventors: James P. McBride, Phoenix, AZ (US); James Richard Stanfield, Glendale, AZ (US); Derek Michael Underhill, Tempe, AZ (US); Jonathan Lewis Nook, Gates Mills, OH (US)

(73) Assignee: The Noco Company, Glenwillow, OH (US)

( * ) Notice: Subject to any disclaimer, the term of this patent is extended or adjusted under 35 U.S.C. 154(b) by 725 days.

(21) Appl. No.: 17/767,706

(22) PCT Filed: Oct. 7, 2020

(86) PCT No.: PCT/US2020/054581
§ 371 (c)(1),
(2) Date: Apr. 8, 2022

(87) PCT Pub. No.: WO2021/071949
PCT Pub. Date: Apr. 15, 2021

(65) Prior Publication Data
US 2023/0344261 A1 Oct. 26, 2023

Related U.S. Application Data

(60) Provisional application No. 62/913,079, filed on Oct. 9, 2019.

(51) Int. Cl.
*H02J 7/96* (2026.01)
*H01M 10/44* (2006.01)
(Continued)

(52) U.S. Cl.
CPC ............. *H02J 7/96* (2026.01); *H01M 10/446* (2013.01); *H02J 7/80* (2026.01); *H02J 7/875* (2026.01); *H02J 7/92* (2026.01)

(58) Field of Classification Search
CPC .... H02J 7/00306; H02J 7/0047; H02J 7/0071; H02J 7/007182; H01M 10/44; H01M 10/446
(Continued)

(56) References Cited

U.S. PATENT DOCUMENTS 5,589,757 A 12/1996 Klang
6,037,778 A 3/2000 Makhija
(Continued)

FOREIGN PATENT DOCUMENTS

CN 106300279 1/2017
GB 2527858 1/2016
(Continued)

OTHER PUBLICATIONS

CNIPA, Appl. 202080077004.3, Second Office Action, Jul. 27, 2024.
(Continued)

*Primary Examiner* — Julian D Huffman
*Assistant Examiner* — Ryu-Sung P. Weinmann
(74) *Attorney, Agent, or Firm* — Jones Day

(57) ABSTRACT

Provided is a method of charging a deeply discharged battery using a battery charging device, the method including measuring the output voltage of the deeply discharged battery using the battery charging device, and if the output voltage is at or near zero (0) volts, charging the deeply discharged battery using the battery charging device in a forced mode.

70 Claims, 20 Drawing Sheets

(51) Int. Cl.
| | |
|---|---|
| *H02J 7/00* | (2006.01) |
| *H02J 7/80* | (2026.01) |
| *H02J 7/92* | (2026.01) |

(58) Field of Classification Search
USPC ........................................................ 320/124
See application file for complete search history.

(56) References Cited

U.S. PATENT DOCUMENTS

| | | | | |
|---|---|---|---|---|
| 6,424,158 | B2 | 7/2002 | Klang | |
| 6,784,637 | B2 * | 8/2004 | Raichle ..................... | H02J 7/00 |
| | | | | 324/426 |
| 7,479,763 | B2 | 1/2009 | Bertness | |
| 9,197,079 | B2 | 11/2015 | Yip et al. | |
| 10,447,048 | B2 * | 10/2019 | Petzold ................. | H02J 7/0031 |
| 10,461,545 | B2 | 10/2019 | Inoue | |
| 2002/0008523 | A1 | 1/2002 | Klang | |
| 2004/0124810 | A1 | 7/2004 | Smallwood et al. | |
| 2005/0212488 | A1 | 9/2005 | MacNair et al. | |
| 2007/0285049 | A1 | 12/2007 | Krieger et al. | |
| 2008/0297116 | A1 | 12/2008 | Odaohhara et al. | |
| 2010/0164439 | A1 | 7/2010 | Ido | |
| 2010/0301800 | A1 | 12/2010 | Inskeep | |
| 2011/0022826 | A1 | 1/2011 | More et al. | |
| 2013/0021071 | A1 * | 1/2013 | Nadimpalli .......... | H03K 17/223 |
| | | | | 327/143 |
| 2013/0099737 | A1 | 4/2013 | Douglass et al. | |
| 2013/0106362 | A1 | 5/2013 | Mackintosh et al. | |
| 2013/0154543 | A1 * | 6/2013 | Richardson ........... | H02J 7/0034 |
| | | | | 320/109 |
| 2013/0264865 | A1 * | 10/2013 | Sugeno ................... | H02J 3/322 |
| | | | | 307/19 |
| 2014/0117946 | A1 * | 5/2014 | Muller .............. | H02J 13/00002 |
| | | | | 320/162 |
| 2015/0137740 | A1 | 5/2015 | Allos et al. | |
| 2015/0318521 | A1 * | 11/2015 | Zeiler ................. | H01M 50/296 |
| | | | | 429/96 |
| 2015/0366538 | A1 | 12/2015 | McKenna | |
| 2016/0001766 | A1 | 1/2016 | Mori | |
| 2016/0049819 | A1 | 2/2016 | Butler et al. | |
| 2017/0141589 | A1 | 5/2017 | Inoue et al. | |
| 2018/0111491 | A1 | 4/2018 | Nook et al. | |
| 2018/0332408 | A1 * | 11/2018 | Frei ....................... | H02J 7/0071 |
| 2018/0345803 | A1 | 12/2018 | Nook et al. | |

FOREIGN PATENT DOCUMENTS

| | | |
|---|---|---|
| GB | 2584424 | 12/2020 |
| JP | 07298504 | 11/1995 |
| JP | 3182855 | 4/2013 |
| JP | 2013-219984 | 10/2013 |
| WO | WO 2012/160292 | 11/2012 |
| WO | WO 2019/021007 | 1/2019 |
| WO | WO 2021/242833 | 12/2021 |

OTHER PUBLICATIONS

Patent Cooperation Treaty, PCT/US2021/071685, International Search Report and Written Opinion of the International Searching Authority, dated Dec. 27, 2021.

IP Australia, Appl. 2022200612, Examination Report, Jan. 30, 2023.

Farah et al., New Analog Li-Ion Battery Charger Using Pulsed Charging Method, 6th International Conference on Multimedia Computing and Systems (ICMCS), pp. 1-4, 2018.

Mubdir & Fayadh, Smart Charger for Sealed Lead Acid Batteries Based on Parallel Port PC Interfacing, IEEE International Conference on Power and Energy, Kuala Lumpur, Malaysia, Nov.-Dec. 2010.

IP Australia, Appl. 2020362203, Examination Report No. 5, Nov. 2, 2023.

European Patent Office, Appl. 20875608.0, Extended European Search Report, Nov. 29, 2023.

IP Australia, Appl. 2020362203, Examination Report No. 2, Jun. 15, 2023.

Japan Patent Office, Appl. 2022-521507, Office Action, Jun. 20, 2023.

IP Australia, Appl. 2020362203, Examination Report No. 1, Mar. 14, 2023.

CNIPA, Appl. 202080077004.3, Third Office Action, Nov. 9, 2024.

IP Australia, Appl. 2020362203, Examination Report No. 3, Aug. 31, 2023.

IP Australia, Appl. 2020362203, Examination Report No. 4, Oct. 3, 2023.

Patent Cooperation Treaty, PCT/US2020/054581, International Search Report and Written Opinion of the International Searching Authority, dated Dec. 28, 2020.

Indian Patent Appl. 202237021178, Examination Report, dated Aug. 5, 2022.

Patent Cooperation Treaty, PCT/US2021/071685, International Preliminary Report on Patentability, Mar. 28, 2023.

IP Australia, Appl. 2020362203, Examination Report No. 6, Dec. 21, 2023.

CNIPA, Appl. 202080077004.3, First Office Action, Dec. 29, 2023.

UK Intellectual Property Office, Appl. GB2205216.1, Examination Report, Jan. 30, 2023.

CNIPA, Appl. 202080077004.3, Fourth Office Action, Jan. 17, 2025.

CNIPA, Appl. 202080077004.3, Fifth Office Action, Mar. 22, 2025.

IP Australia, Appl. 2024202784, Examination Report No. 1, Jun. 12, 2025.

CNIPA, Appl. 202080077004.3, Rejection Decision, Jun. 18, 2025.

* cited by examiner

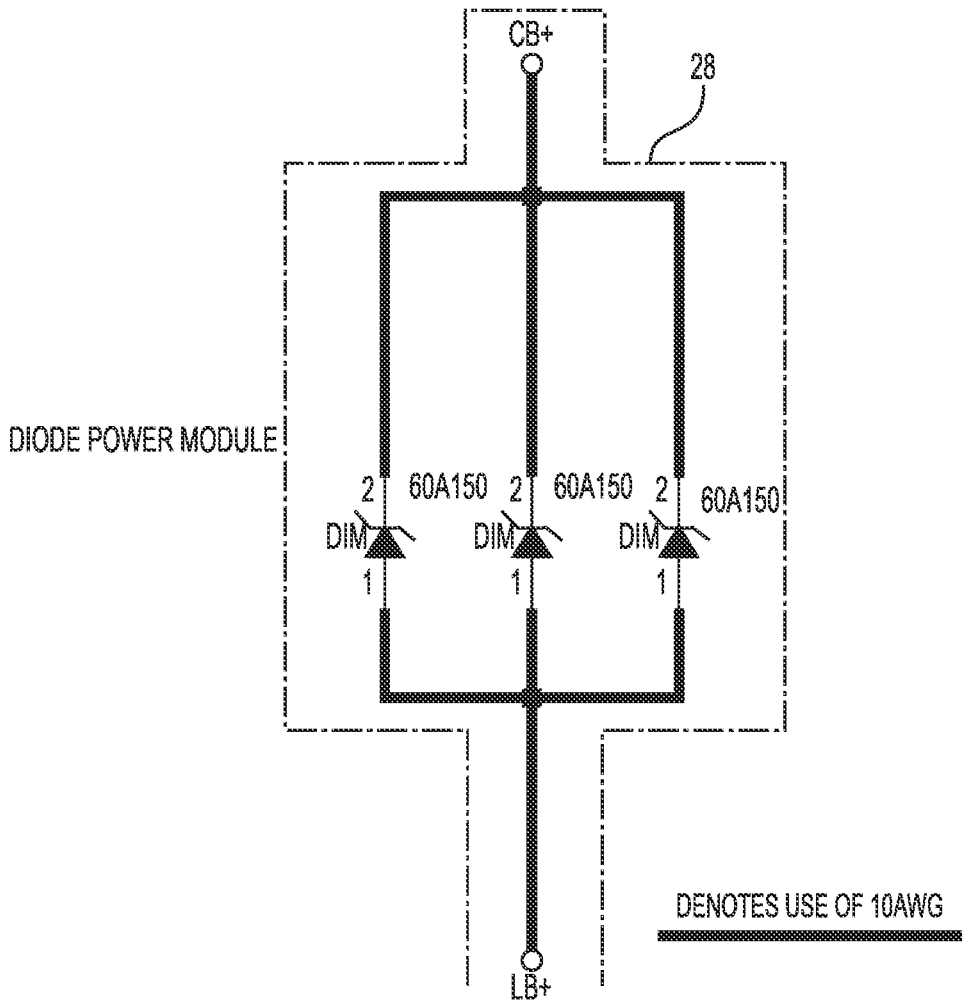
DIODE POWER MODULE
DENOTES USE OF 10AWG
*FIG. 9B*
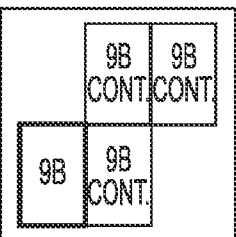

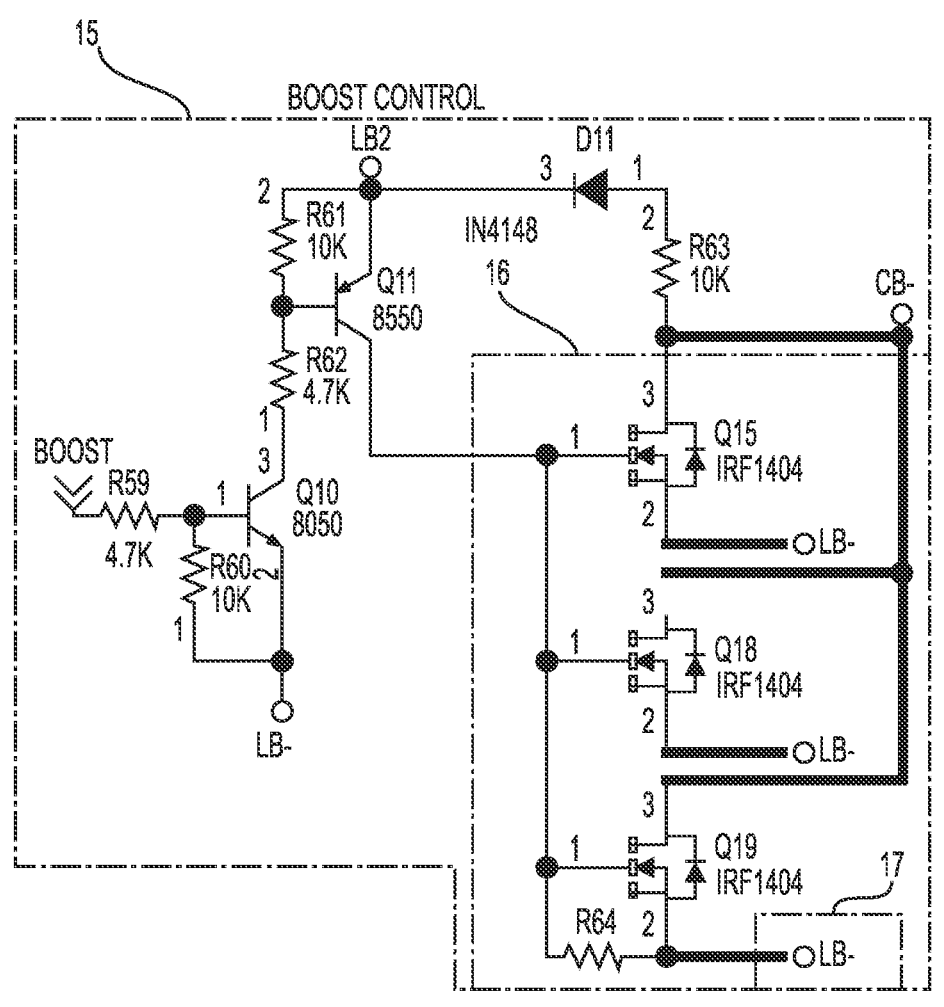
FIG. 9B CONT.
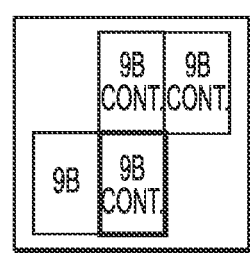

LED9
0.5W

1
C19
10uF
2

68uH L3

D12

SK24

VIN CSN SW XN2113
IC7

X3

DIM

GND

GND

TO FIG. 9B CONT.

| | 9B CONT | 9B CONT |
|---|---|---|
| 9B | 9B CONT. | |

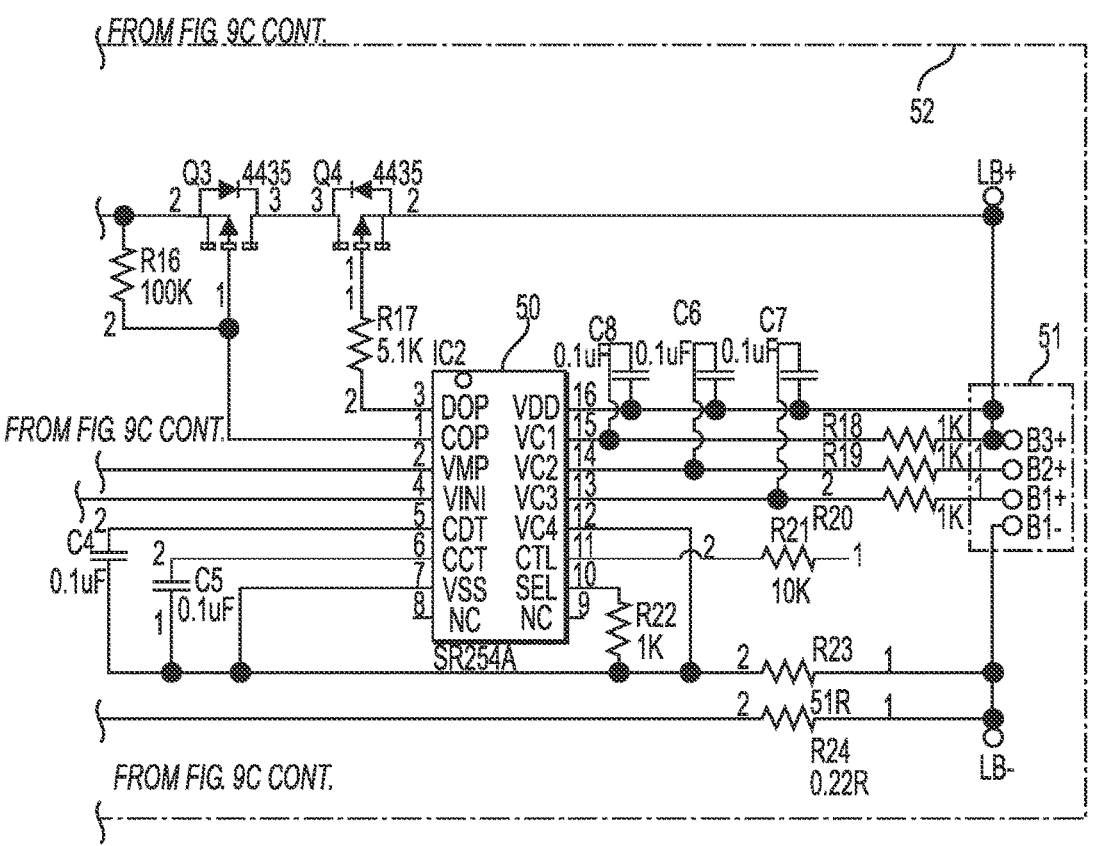
*FROM FIG. 9C CONT.*
*FROM FIG. 9C CONT.*
*FROM FIG. 9C CONT.*
FIG. 9C CONT.
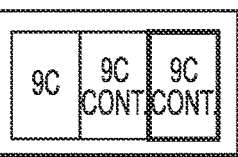

BATTERY CHARGING DEVICE FOR CHARGING A DEEPLY DISCHARGED BATTERY, AND BATTERY CHARGING SYSTEM AND METHOD

FIELD

The present invention is directed to a battery charging device (e.g. smart battery charger) and battery charging system for charging a deeply discharged battery, and a battery charging system and method for charging a deeply discharged battery.

BACKGROUND

Smart battery chargers implement various protections to ensure that they are used properly. One of the protections commonly implemented is a measurement of the battery voltage prior to starting a charge cycle. If the battery voltage is too low the smart battery charger will not start charging.

Under normal usage, a typical lead acid battery will never get low enough to prevent the smart charger from charging. However, in the case that a current load is applied to the battery and left connected, it is possible to encounter a battery with a voltage close to 0V. In this situation the typical smart battery charger will not start a charge cycle.

The smart charger uses a battery pack comprising lithium ion cells and a Battery Management System (BMS) configured to disconnect the lithium ion cells from the external battery terminals in case of an error. When the lithium ion cells are disconnected internally, the voltage will measure 0V at the external battery terminals. In some BMS implementations, after an over-discharge condition, the external battery voltage will remain at 0V even when the error condition is removed. An external voltage must be applied to recover the battery. However, a typical smart battery charger will not apply a charge voltage because if it detects the battery voltage is at 0V, the smart battery charger will not start a charge cycle.

Therefore a need exists for a smart battery charger, system, and method to allow a smart battery charger to charge deeply discharged batteries without completely eliminating the low voltage protection.

SUMMARY

The battery charging device (e.g. smart battery charger) according to the present invention, for example, can be a portable and automatic battery charger for use with both 12V and 24V lead-acid batteries (e.g. wet, gel, MF, EFB, AGM batteries) and/or lithium ion batteries. The smart battery charging device, for example, is structured and arranged for charging cars, boats, RVs, SUVs, diesel trucks, motorcycles, ATVs, snowmobiles, personal watercraft, lawn mowers, and other vehicles or equipment. It also can be used, for example, as a battery maintainer to keep both starter batteries and deep-cycle batteries fully charged. It also can monitor battery activity, for example, for safe and efficient charging without any overcharge. The smart battery charging device, for example, can include a built-in battery desulfator in order to rejuvenate under-performing batteries.

The present invention comprises a battery charging device (e.g. smart battery charger) comprising or consisting of a special charging mode or feature designated as "Force Mode" (e.g. trademark FORCE MODE) that allows the battery charging device to start charging a deeply discharged battery, even if the deeply discharged battery voltage is near 0V (i.e. zero volts). This allows the battery charging device to be used to charge deeply discharged lead-acid batteries, and/or recover over-discharged lithium batteries with an open BMS. For example, the battery charging device can be configured to automatically begin the Force Mode, or a user can force the battery charging device to begin the Force Mode (e.g. press Force Mode button).

The Force Mode feature allows the battery charging device to enter a battery charging mode when the battery voltage of the deeply discharged battery (e.g. deeply discharged vehicle battery) is below a minimum threshold. The purpose is to allow the battery charging device to be able to charge, for example, a deeply discharged lead-acid battery, and to reset the battery management system (BMS) in an over-discharged lithium ion battery of the battery charging device.

The Force Mode operates as a normal charge mode except it is limited to a short period of time for safety reasons. The timeout period for Force Mode, for example, may be five (5) minutes, or could be longer or shorter depending on the particular application, type, and size of deeply discharged battery that is being charged.

After the Force Mode is terminated due to expiration of the designated Force Mode time, the battery charging device will check the battery voltage. If the battery voltage is above the normal starting voltage threshold, the battery charging device will begin charging in its normal mode. If the battery voltage is still too low, the battery charging device will return to its standby or off mode.

Because the Force Mode is operating without the normal low battery voltage check, the user interface will require explicit selection of the mode, and provide user feedback that they are in this mode.

In accordance with an aspect of the invention, the battery charging device is provided for jump starting a deeply discharged vehicle battery, including: an internal power supply; an optional output port having positive and negative polarity outputs; a vehicle battery isolation sensor connected in circuit with the positive and negative polarity outputs, configured to detect presence of a vehicle battery connected between the positive and negative polarity outputs; a reverse polarity sensor connected in circuit with the positive and negative polarity outputs, configured to detect polarity of a vehicle battery connected between the positive and negative polarity outputs; a power FET switch connected between the internal power supply and the output port; and a microcontroller configured to receive input signals from the vehicle isolation sensor and the reverse polarity sensor, and to provide an output signal to the power FET switch, such that the power FET switch is turned on to connect the internal power supply to the output port in response to signals from the sensors indicating the presence of a vehicle battery at the output port and proper polarity connection of positive and negative terminals of the vehicle battery with the positive and negative polarity outputs.

In accordance with another aspect of the invention, the internal power supply is a rechargeable lithium ion battery pack.

In accordance with yet another aspect of the invention, a charging or jumper cable device is provided, having a plug configured to plug into an output port of a handheld battery charger booster device having an internal power supply; a pair of cables integrated with the plug at one respective end thereof; the pair of cables being configured to be separately connected to terminals of a battery at another respective end thereof.

The presently described subject matter is directed to a method of charging a deeply discharged battery, the method comprising or consisting of measuring the output voltage of the deeply discharged battery; and if the output voltage is at or near zero (0) volts, charging the deeply discharged battery in a Force Mode.

The presently described subject matter is directed to a method of charging a deeply discharged battery, the method comprising or consisting of measuring the output voltage of the deeply discharged battery; and if the output voltage is at or near zero (0) volts, charging the deeply discharged battery in a Force Mode, wherein the deeply discharged battery is charged in the forced mode for a predetermined amount of time.

The presently described subject matter is directed to a method of charging a deeply discharged battery, the method comprising or consisting of measuring the output voltage of the deeply discharged battery; and if the output voltage is at or near zero (0) volts, charging the deeply discharged battery in a Force Mode, wherein the deeply discharged battery is charged in the forced mode for a predetermined amount of time, and, wherein the predetermined amount of time is five (5) minutes.

The presently described subject matter is directed to a method of charging a deeply discharged battery, the method comprising or consisting of measuring the output voltage of the deeply discharged battery; and if the output voltage is at or near zero (0) volts, charging the deeply discharged battery in a Force Mode, wherein the deeply discharged battery is charged in the forced mode for a predetermined amount of time, and, wherein the charging of the deeply discharged battery in Force Mode is terminated upon reaching the predetermined amount of time.

The presently described subject matter is directed to a method of charging a deeply discharged battery, the method comprising or consisting of measuring the output voltage of the deeply discharged battery; and if the output voltage is at or near zero (0) volts, charging the deeply discharged battery in a Force Mode, wherein the deeply discharged battery is charged in the forced mode for a predetermined amount of time, and, wherein the charging of the deeply discharged battery in Force Mode is terminated upon reaching the predetermined amount of time, further comprising measuring the deeply discharged battery after the Force Mode is terminated.

The presently described subject matter is directed to a method of charging a deeply discharged battery, the method comprising or consisting of measuring the output voltage of the deeply discharged battery; and if the output voltage is at or near zero (0) volts, charging the deeply discharged battery in a Force Mode, wherein the deeply discharged battery is charged in the forced mode for a predetermined amount of time, and wherein the charging of the deeply discharged battery in Force Mode is terminated upon reaching the predetermined amount of time, further comprising measuring the deeply discharged battery after the Force Mode is terminated, wherein if the deeply discharged battery is above a normal starting voltage threshold after the Force Mode is terminated and the deeply discharged battery output voltage is measured, the rechargeable battery charging device will begin charging in a normal mode.

The presently described subject matter is directed to a method of charging a deeply discharged battery, the method comprising or consisting of measuring the output voltage of the deeply discharged battery; and if the output voltage is at or near zero (0) volts, charging the deeply discharged battery in a Force Mode, wherein the deeply discharged battery is charged in the forced mode for a predetermined amount of time, and wherein the charging of the deeply discharged battery in Force Mode is terminated upon reaching the predetermined amount of time, further comprising measuring the deeply discharged battery after the Force Mode is terminated, wherein if the deeply discharged battery is above a normal starting voltage threshold after the Force Mode is terminated and the deeply discharged battery output voltage is measured, the rechargeable battery charging device will begin charging in a normal mode, and wherein if the deeply discharged battery voltage is too low after the Force Mode is terminated and the deeply discharged battery output voltage is measured, then the rechargeable battery charging device will return to a standby or off mode.

The presently described subject matter is directed to a method of charging a deeply discharged battery, the method comprising or consisting of measuring the output voltage of the deeply discharged battery; and if the output voltage is at or near zero (0) volts, charging the deeply discharged battery in a Force Mode, wherein the deeply discharged battery is a lead-acid battery.

The presently described subject matter is directed to a method of charging a deeply discharged battery, the method comprising or consisting of measuring the output voltage of the deeply discharged battery; and if the output voltage is at or near zero (0) volts, charging the deeply discharged battery in a Force Mode, wherein the deeply discharged battery is an over-discharge lithium ion battery with an open battery management system (BMS).

The presently described subject matter is directed to a rechargeable battery charging device for charging a deeply discharged battery, the device comprising or consisting of: a rechargeable battery having a positive terminal and a negative terminal; a positive battery cable connected or connectable to the positive terminal of the rechargeable battery; a negative battery cable connected or connectable to the negative terminal of the rechargeable battery; a detector for measuring an output voltage of the deeply discharged battery; a programmable microcontroller unit (MCI) connected to one or more components or parts of the rechargeable battery charging device, the MCI structured and arranged to control operation of the rechargeable battery charging device; a user interface connected to the MCI, the user interface structured and arranged to display one or more functions or modes of the rechargeable battery charging device; and a controller structured and arranged to control the charging of the deeply discharged battery, the controller having a Force Mode for charging the deeply discharge battery even if a battery voltage is near 0 volts.

The presently described subject matter is directed to a rechargeable battery charging device for charging a deeply discharged battery, the device comprising or consisting of: a rechargeable battery having a positive terminal and a negative terminal; a positive battery cable connected or connectable to the positive terminal of the rechargeable battery; a negative battery cable connected or connectable to the negative terminal of the rechargeable battery; a detector for measuring an output voltage of the deeply discharged battery; a programmable microcontroller unit (MCI) connected to one or more components or parts of the rechargeable battery charging device, the MCI structured and arranged to control operation of the rechargeable battery charging device; a user interface connected to the MCI, the user interface structured and arranged to display one or more functions or modes of the rechargeable battery charging device; and a controller structured and arranged to control the charging of the deeply discharged battery, the controller having a Force Mode for charging the deeply discharge battery even if a battery voltage is near 0 volts, wherein the Force Mode is configured to operate for a predetermined period of time.

The presently described subject matter is directed to a rechargeable battery charging device for charging a deeply discharged battery, the device comprising or consisting of: a rechargeable battery having a positive terminal and a negative terminal; a positive battery cable connected or connectable to the positive terminal of the rechargeable battery; a negative battery cable connected or connectable to the negative terminal of the rechargeable battery; a detector for measuring an output voltage of the deeply discharged battery; a programmable microcontroller unit (MCI) connected to one or more components or parts of the rechargeable battery charging device, the MCI structured and arranged to control operation of the rechargeable battery charging device; a user interface connected to the MCI, the user interface structured and arranged to display one or more functions or modes of the rechargeable battery charging device; and a controller structured and arranged to control the charging of the deeply discharged battery, the controller having a Force Mode for charging the deeply discharge battery even if a battery voltage is near 0 volts, wherein the Force Mode is configured to operate for a predetermined period of time, and wherein the predetermined period of time is five minutes.

The presently described subject matter is directed to a rechargeable battery charging device for charging a deeply discharged battery, the device comprising or consisting of: a rechargeable battery having a positive terminal and a negative terminal; a positive battery cable connected or connectable to the positive terminal of the rechargeable battery; a negative battery cable connected or connectable to the negative terminal of the rechargeable battery; a detector for measuring an output voltage of the deeply discharged battery; a programmable microcontroller unit (MCI) connected to one or more components or parts of the rechargeable battery charging device, the MCI structured and arranged to control operation of the rechargeable battery charging device; a user interface connected to the MCI, the user interface structured and arranged to display one or more functions or modes of the rechargeable battery charging device; and a controller structured and arranged to control the charging of the deeply discharged battery, the controller having a Force Mode for charging the deeply discharge battery even if a battery voltage is near 0 volts, wherein the Force Mode is configured to operate for a predetermined period of time, and wherein after the Force Mode is terminated due to expiration of the predetermined period of time, the rechargeable battery charging device will measure the deeply discharged battery voltage.

The presently described subject matter is directed to a rechargeable battery charging device for charging a deeply discharged battery, the device comprising or consisting of: a rechargeable battery having a positive terminal and a negative terminal; a positive battery cable connected or connectable to the positive terminal of the rechargeable battery; a negative battery cable connected or connectable to the negative terminal of the rechargeable battery; a detector for measuring an output voltage of the deeply discharged battery; a programmable microcontroller unit (MCI) connected to one or more components or parts of the rechargeable battery charging device, the MCI structured and arranged to control operation of the rechargeable battery charging device; a user interface connected to the MCI, the user interface structured and arranged to display one or more functions or modes of the rechargeable battery charging device; and a controller structured and arranged to control the charging of the deeply discharged battery, the controller having a Force Mode for charging the deeply discharge battery even if a battery voltage is near 0 volts, wherein the Force Mode is configured to operate for a predetermined period of time, and wherein after the Force Mode is terminated due to expiration of the predetermined period of time, the rechargeable battery charging device will measure the deeply discharged battery voltage, wherein if the deeply discharged battery is above a normal starting voltage threshold, the rechargeable battery charging device will begin charging in a normal mode.

The presently described subject matter is directed to a rechargeable battery charging device for charging a deeply discharged battery, the device comprising or consisting of: a rechargeable battery having a positive terminal and a negative terminal; a positive battery cable connected or connectable to the positive terminal of the rechargeable battery; a negative battery cable connected or connectable to the negative terminal of the rechargeable battery; a detector for measuring an output voltage of the deeply discharged battery; a programmable microcontroller unit (MCI) connected to one or more components or parts of the rechargeable battery charging device, the MCI structured and arranged to control operation of the rechargeable battery charging device; a user interface connected to the MCI, the user interface structured and arranged to display one or more functions or modes of the rechargeable battery charging device; and a controller structured and arranged to control the charging of the deeply discharged battery, the controller having a Force Mode for charging the deeply discharge battery even if a battery voltage is near 0 volts, wherein the Force Mode is configured to operate for a predetermined period of time, and wherein after the Force Mode is terminated due to expiration of the predetermined period of time, the rechargeable battery charging device will measure the deeply discharged battery voltage, and wherein if the deeply discharged battery voltage is too low, then the rechargeable battery charging device will return to a standby or off mode.

The presently described subject matter is directed to a rechargeable battery charging device for charging a deeply discharged battery, the device comprising or consisting of: a rechargeable battery having a positive terminal and a negative terminal; a positive battery cable connected or connectable to the positive terminal of the rechargeable battery; a negative battery cable connected or connectable to the negative terminal of the rechargeable battery; a detector for measuring an output voltage of the deeply discharged battery; a programmable microcontroller unit (MCI) connected to one or more components or parts of the rechargeable battery charging device, the MCI structured and arranged to control operation of the rechargeable battery charging device; a user interface connected to the MCI, the user interface structured and arranged to display one or more functions or modes of the rechargeable battery charging device; and a controller structured and arranged to control the charging of the deeply discharged battery, the controller having a Force Mode for charging the deeply discharge battery even if a battery voltage is near 0 volts, wherein the user interface is structured and arranged to allow a user to select the Force Mode.

The presently described subject matter is directed to a rechargeable battery charging device for charging a deeply discharged battery, the device comprising or consisting of: a rechargeable battery having a positive terminal and a negative terminal; a positive battery cable connected or connectable to the positive terminal of the rechargeable battery; a negative battery cable connected or connectable to the negative terminal of the rechargeable battery; a detector for measuring an output voltage of the deeply discharged battery; a programmable microcontroller unit (MCI) connected to one or more components or parts of the rechargeable battery charging device, the MCI structured and arranged to control operation of the rechargeable battery charging device; a user interface connected to the MCI, the user interface structured and arranged to display one or more functions or modes of the rechargeable battery charging device; and a controller structured and arranged to control the charging of the deeply discharged battery, the controller having a Force Mode for charging the deeply discharge battery even if a battery voltage is near 0 volts, wherein the user interface is structured and arranged to allow a user to select the Force Mode, and wherein the user interface is configured to provide user feedback if the rechargeable battery charging device is in the Force Mode.

The presently described subject matter is directed to a rechargeable battery charging device for charging a deeply discharged battery, the device comprising or consisting of: a rechargeable battery having a positive terminal and a negative terminal; a positive battery cable connected or connectable to the positive terminal of the rechargeable battery; a negative battery cable connected or connectable to the negative terminal of the rechargeable battery; a detector for measuring an output voltage of the deeply discharged battery; a programmable microcontroller unit (MCI) connected to one or more components or parts of the rechargeable battery charging device, the MCI structured and arranged to control operation of the rechargeable battery charging device; a user interface connected to the MCI, the user interface structured and arranged to display one or more functions or modes of the rechargeable battery charging device; and a controller structured and arranged to control the charging of the deeply discharged battery, the controller having a Force Mode for charging the deeply discharge battery even if a battery voltage is near 0 volts, wherein the user interface is structured and arranged to allow a user to select the Force Mode, wherein the user interface is configured to provide user feedback if the rechargeable battery charging device is in the Force Mode, and wherein the user feedback is provided by lighting a light emitting diode (LED).

The presently described subject matter is directed to a rechargeable battery charging device for charging a deeply discharged battery, the device comprising or consisting of: a rechargeable battery having a positive terminal and a negative terminal; a positive battery cable connected or connectable to the positive terminal of the rechargeable battery; a negative battery cable connected or connectable to the negative terminal of the rechargeable battery; a detector for measuring an output voltage of the deeply discharged battery; a programmable microcontroller unit (MCI) connected to one or more components or parts of the rechargeable battery charging device, the MCI structured and arranged to control operation of the rechargeable battery charging device; a user interface connected to the MCI, the user interface structured and arranged to display one or more functions or modes of the rechargeable battery charging device; and a controller structured and arranged to control the charging of the deeply discharged battery, the controller having a Force Mode for charging the deeply discharge battery even if a battery voltage is near 0 volts, wherein the deeply discharged battery is a lead-acid battery.

The presently described subject matter is directed to a rechargeable battery charging device for charging a deeply discharged battery, the device comprising or consisting of: a rechargeable battery having a positive terminal and a negative terminal; a positive battery cable connected or connectable to the positive terminal of the rechargeable battery; a negative battery cable connected or connectable to the negative terminal of the rechargeable battery; a detector for measuring an output voltage of the deeply discharged battery; a programmable microcontroller unit (MCI) connected to one or more components or parts of the rechargeable battery charging device, the MCI structured and arranged to control operation of the rechargeable battery charging device; a user interface connected to the MCI, the user interface structured and arranged to display one or more functions or modes of the rechargeable battery charging device; and a controller structured and arranged to control the charging of the deeply discharged battery, the controller having a Force Mode for charging the deeply discharge battery even if a battery voltage is near 0 volts, wherein the deeply discharged battery is an over-discharge lithium ion battery with an open battery management system (BMS).

DESCRIPTION OF PREFERRED EMBODIMENTS

Figure 1:
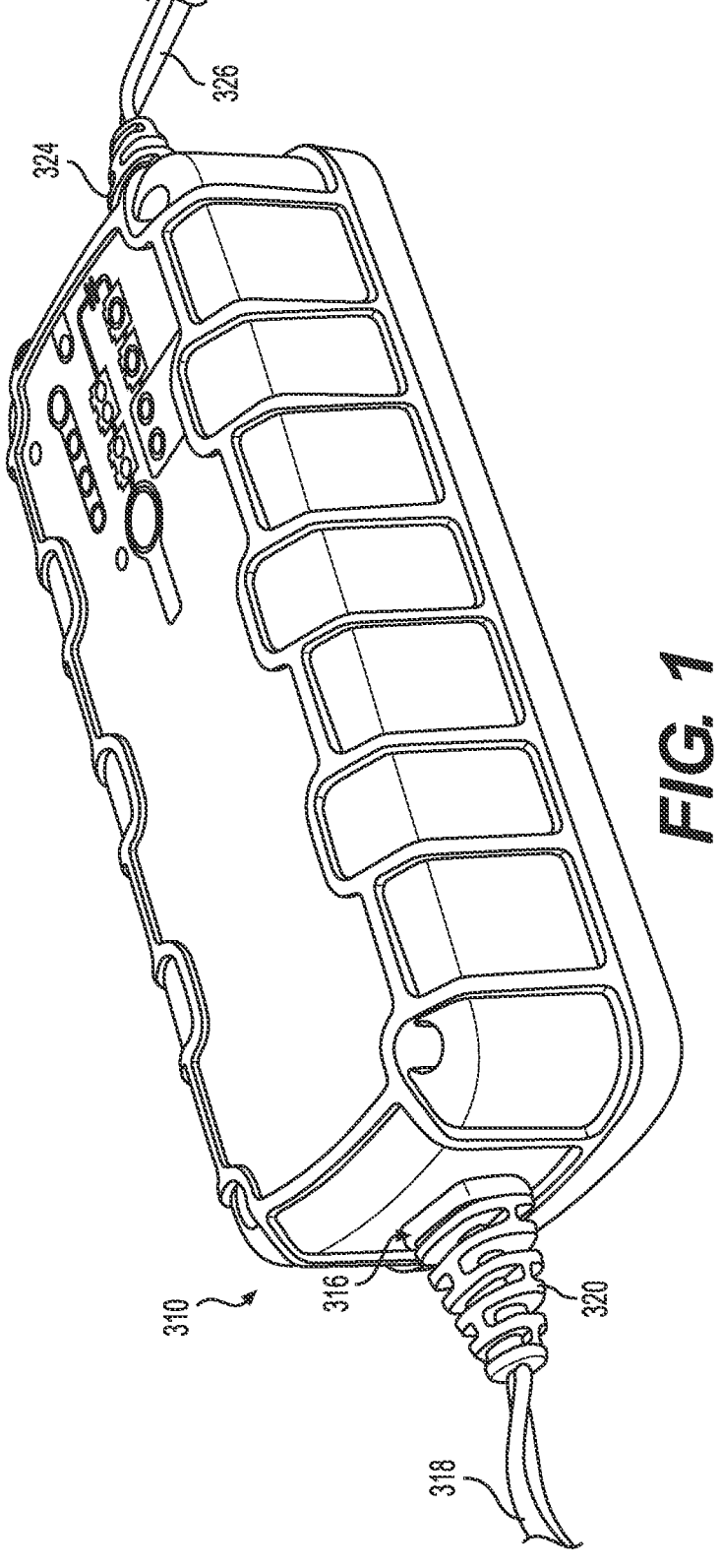
FIG. 1 is a perspective view of a battery charging device according to the present invention.
Figure 2:
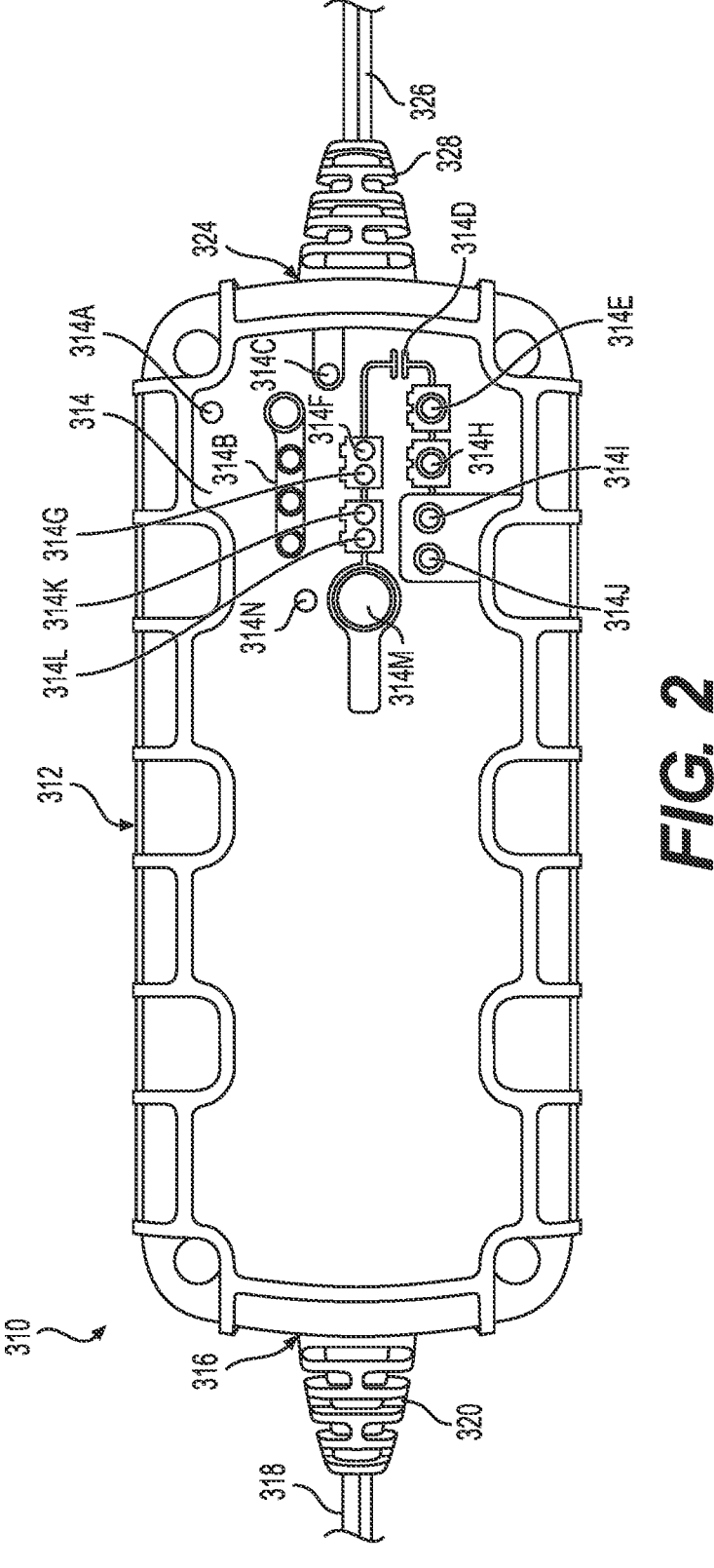
FIG. 2 is a front elevational view showing the battery charging device shown in FIG. 1.
Figure 3:
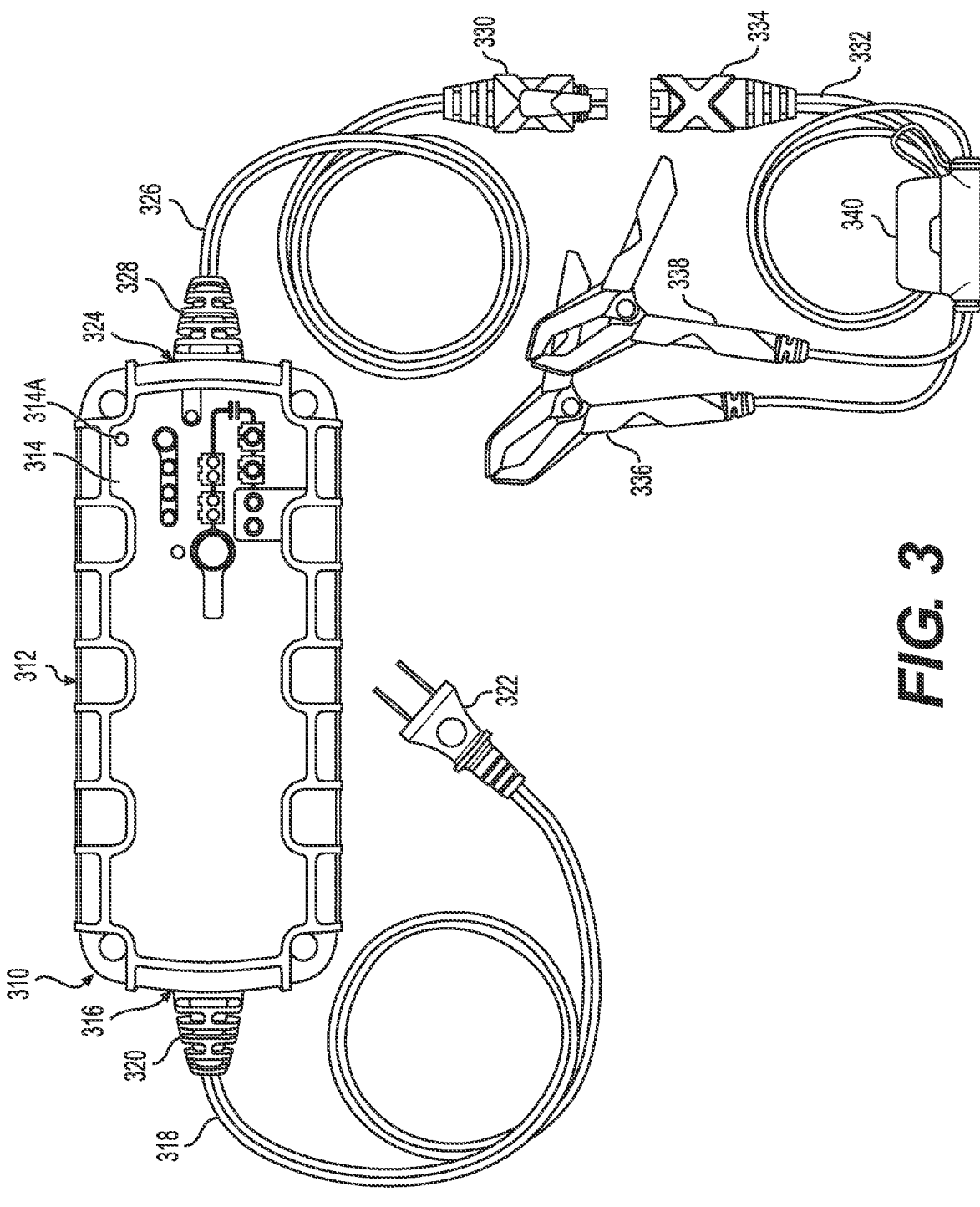
FIG. 3 is a front view showing the battery charging device shown in FIGS. 1 and 2 showing the power cord assembly and battery charging cable assembly with battery cables and battery clamps.

A battery charging device 310 according to the present invention is shown in FIGS. 1-3.

The battery charging device 310 comprises a housing or casing 312 containing the electronic components of the battery charging device 310, an electronic display 314 (i.e. graphic user interface (GUI)), an A/C inlet port 316 for accommodating an A/C power cord 318 having an inlet plug 320 and an A/C plug 322, an outlet port 324 for accommodating a battery cable assembly 326 having an outlet plug 328 and a male plug connector 330.

Another battery cable assembly 332 is shown in FIG. 3 having a female plug connector 334 located at one end and a positive battery clamp 336 and negative battery clamp 338 located at an opposite end thereof. The male plug connector 330 of the battery cable assembly 326 releasably connects to the female plug connector 334 of the battery cable assembly 332.

Figure 4:
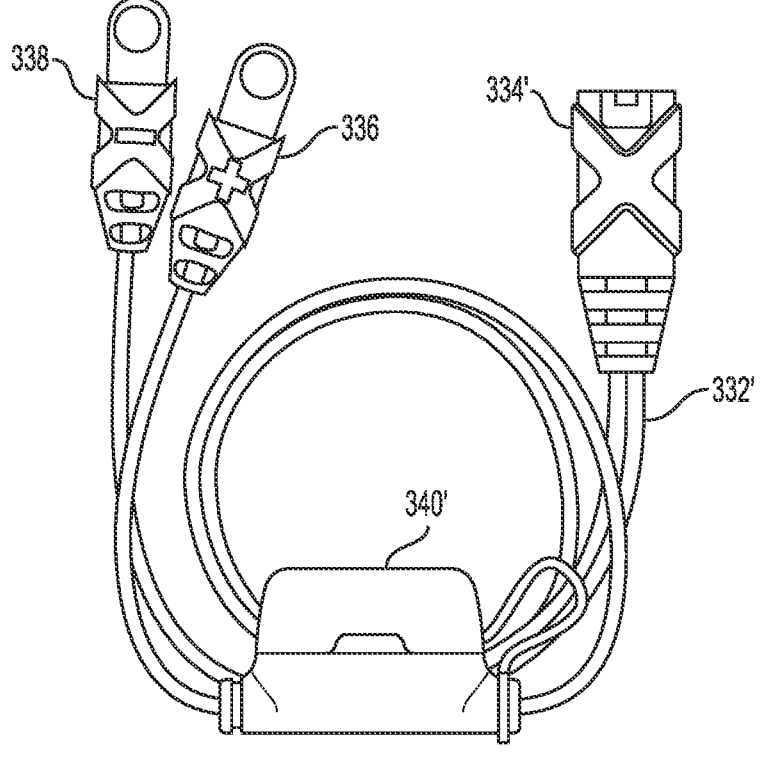
FIG. 4 is a front view of an alternative battery charging cable assembly with positive and negative eyelet connectors for attachment to positive and negative battery clamps or directly to positive and negative terminals of a deeply discharged battery.

Alternatively, the battery cable assembly 332' (FIG. 4) is provided with the female plug connector 334' located at one end and a positive battery cable eyelet connector 336 and a negative battery cable eyelet connector 338 located at an opposite end thereof. The positive battery cable eyelet connector 336 can be connected to a positive battery clamp or directly to the positive terminal of the deeply discharged battery. The negative battery cable eyelet connector 338 can be connected to a negative battery clamp or directly to the negative terminal of the deeply discharged battery. This eyelet connectors 336 and 338 provide a more permanent type of connection with the deeply discharged battery compared to the set of battery clamps.

The electronic display 314 comprises the following features or indicators:

1) Force Mode LED 314A;
2) Charge Level LEDs 314B;
3) Standby LED 314C;
4) "Push & Hold" Divider 314D;
5) 12V LITHIUM LED 314E;
6) 24V COLD/AGM LED 314F;
7) 24V NORM LED 314G;
8) 12V AGM+ LED 314H;
9) 13.6V SUPPLY LED 314I;
10) 12V REPAIR LED 314J;
11) 12V COLD/AGM LED 314K;
12) 12V NORM LED 314L;
13) Mode Button 314M; and
14) Error LED 314N.

Force Mode Feature

A special charging mode feature and method designated "Force Mode" allows the user to force the charger to start charging even if the battery voltage is near 0V. This allows the charger to be used to charge severely discharged lead-acid batteries, and recover over-discharged lithium batteries with an open BMS.

Force Mode operates as a normal charge mode except it is limited to a short period of time for safety reasons. The timeout period for Force mode may be 5 minutes, or could be longer or shorter depending on the application and type and size of battery that is being charged.

After Force mode is terminated due to expiration of the designated Force Mode time, the charger will check the battery voltage. If the battery voltage is above the normal starting voltage threshold, the charger will begin charging in its normal mode. If the battery voltage is still too low, the charger will return to its standby or off mode.

Because Force mode is operating without the normal low battery voltage check, the user interface will require explicit selection of the mode, and provide user feedback that they are in this mode.

The Force Mode feature and method, for example, can be applied to the battery charging device 310. For example, the display 314 can be provided with an LED 314A (FIG. 1) to indicate when the Force Mode feature is "on." The battery charging device 310 can be configured to automatically turn "on" and "off" the Force Mode feature (e.g. Force Mode feature automatically turned on when the battery charging device 310 is properly connected to a deeply discharged battery and the battery charging device 310 is turned "on". Alternatively, the battery charging device 310 can be provided with a switch (e.g. button on display 314) to manually turn "on" and "off" the Force Mode feature.

Figure 5:
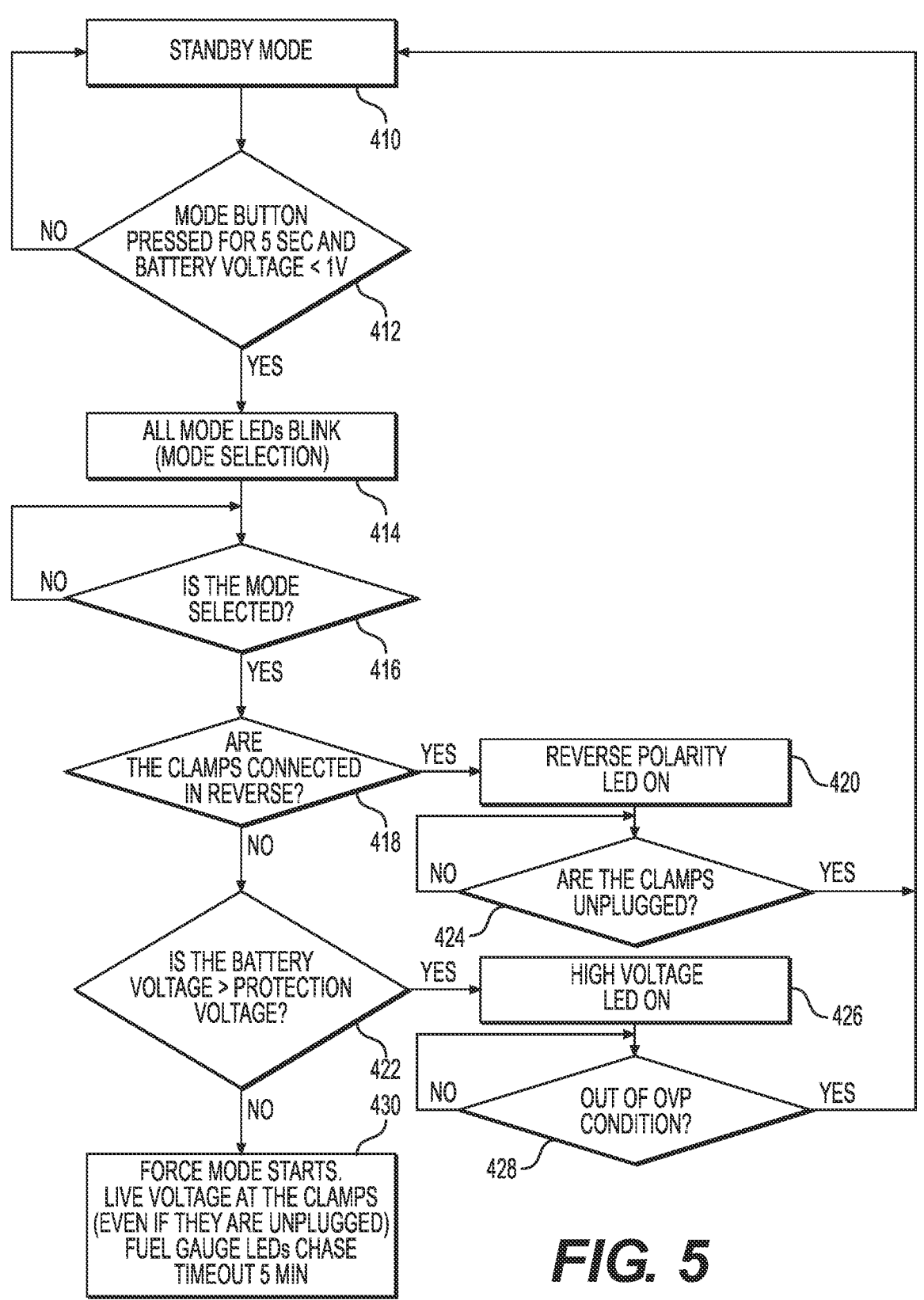
FIG. 5 is a flow diagram showing an exemplary embodiment of the Force mode feature and operation.

A flow diagram of an exemplary Force Mode for initially charging a deeply discharged battery is shown in FIG. 5. The flow diagram shows:

Start 410—The Force Mode is initially in Standby Mode.

Decision 412—Mode button pressed for 5 sec (seconds) and Battery Voltage is less than 1V (volt). The deeply discharged battery voltage is detected to determine if less than 1V.
  If YES, then advance to process 414—All mode LEDs blink.
  If NO, then return to Start 410.

Process 414—All mode LEDs blink (mode selection).

Decision 416—Is the Mode selected?
  If YES, then advance to Decision 418—Are the clamps connected in reverse?
  IF NO, then return prior to Decision 416.

Decision 418—Are the clamps connected in reverse?
  If YES, then advance to process 420—Reverse polarity LED on.
  If NO, then advance to Decision 422—Is the Battery Voltage greater than Protection Voltage?

Process 420—Reverse polarity LED on

Decision 422—Is the Battery Voltage greater than Protection Voltage?
  If YES, then advance to Process 426—High Voltage LED on.
  If NO, then advance to Process 430—Force Mode Starts AND Live voltage at the clamps (even if they are unplugged) AND Fuel Gauge LEDs chase AND Timeout (for) 5 min (minutes).

Decision 424—Are the (battery) clamps unplugged?
  If YES, then return to Start 410.
  If NO, then return prior to Decision 424.

Process 426—High Voltage LED on

Decision 428—Out of OVP condition?
  If YES, then return to Start 410.
  If NO, then return prior to Decision 428.

Process 430—Force Mode Starts AND Live voltage at the (battery) clamps (even if they are unplugged AND Fuel Gauge LEDs chase AND Timeout 5 min (minutes).

Figure 6:
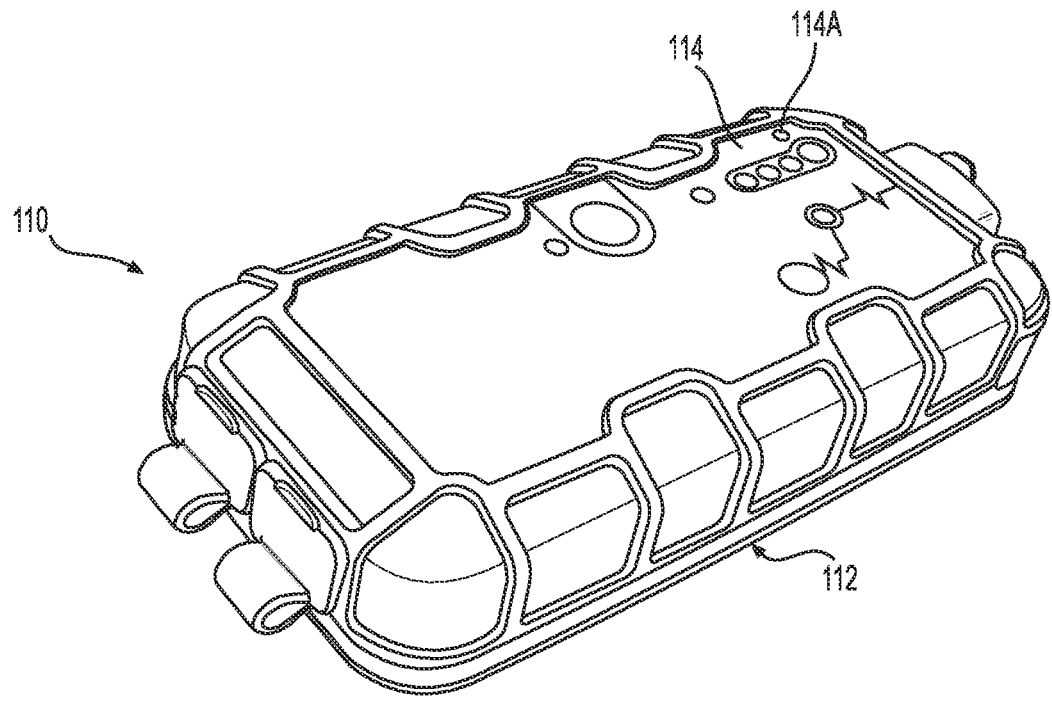
FIG. 6 is a perspective view of another battery charging device according to the present invention with power cord and battery charging cable assembly detached.
Figure 7:
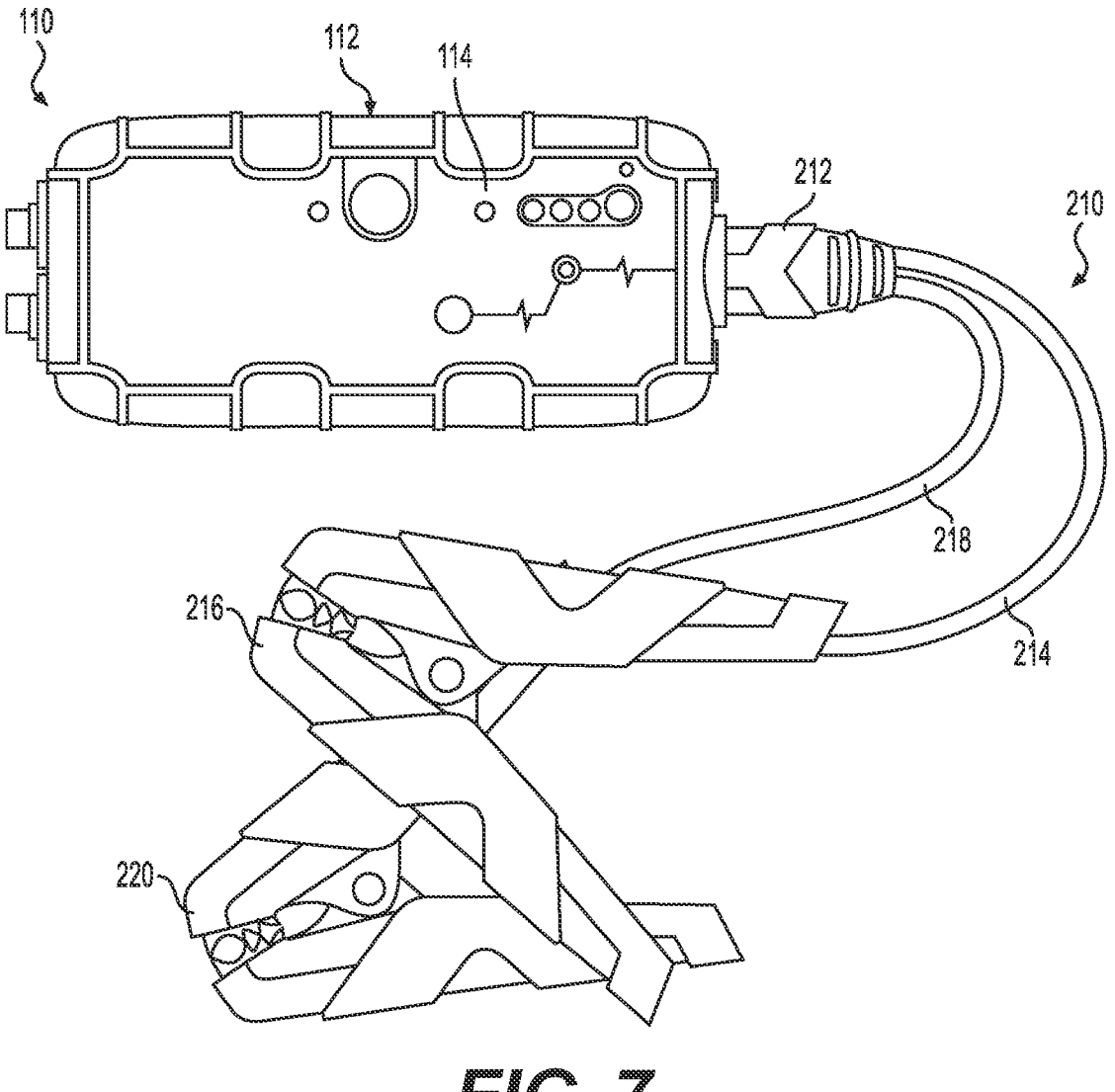
FIG. 7 is a front elevational view showing the battery charging device of FIG. 6 with battery charging cable assembly with battery clamps attached.

Another battery charging device 110 according to the present invention is shown in FIGS. 6 and 7.

The battery charging device 110 comprises a housing or casing 112 containing the electronic components of the battery charging device 110, an electronic display 114 (i.e. graphic user interface (GUI)), a positive battery cable 214 with a positive battery clamp 216 (FIG. FIG. 7), and a negative battery cable 218 with a negative battery clamp 220 (FIG. 7).

Figure 8:
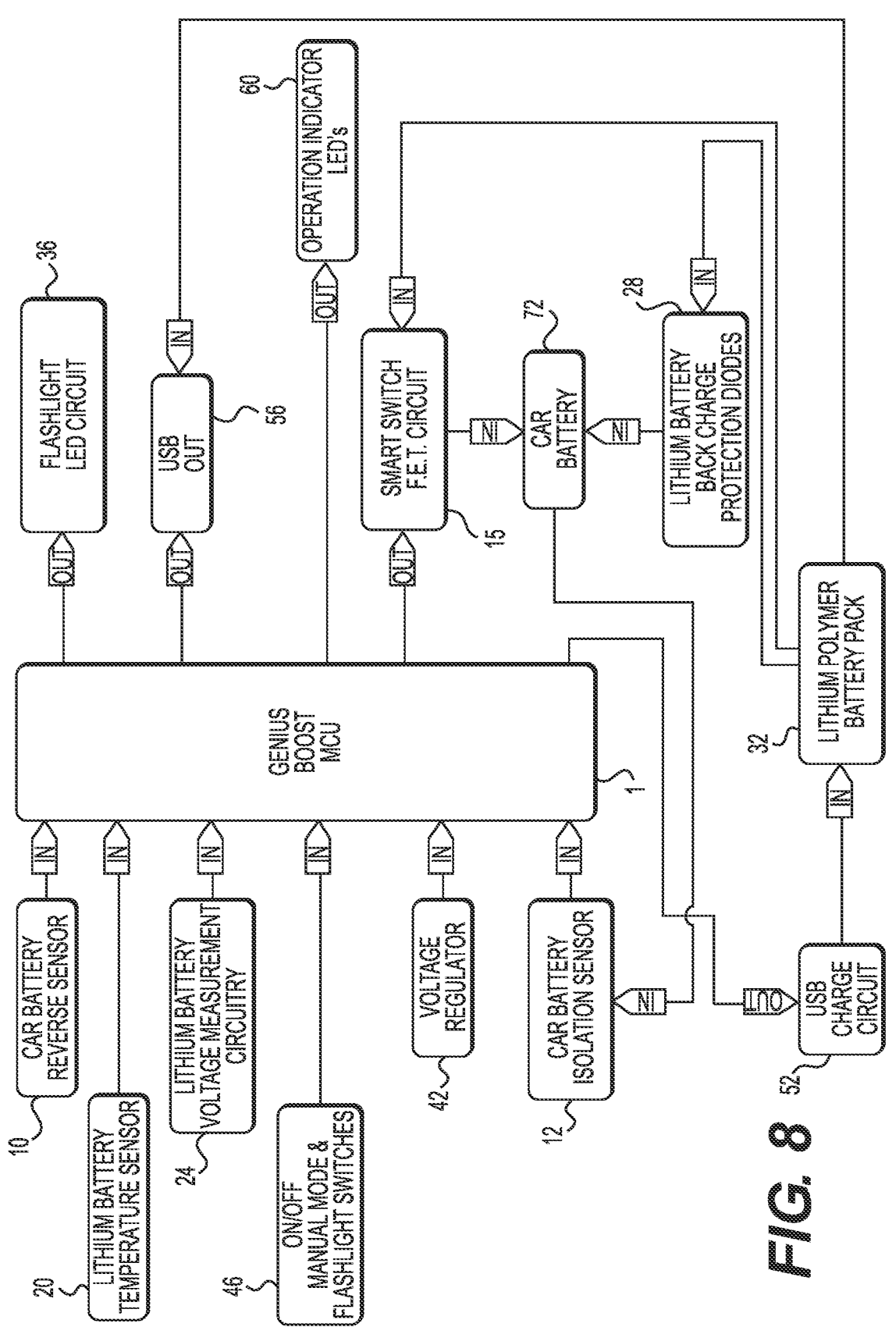
FIG. 8 is a functional block diagram of the battery charging device shown in FIG. 6.

FIG. 8 shows a functional block diagram of a battery charging device (e.g. handheld battery booster) according to one aspect of the invention. At the heart of the handheld battery booster is a lithium polymer battery pack 32, which stores sufficient energy to jump start a vehicle engine served by a conventional 12 volt lead-acid or valve regulated lead-acid battery. In one example embodiment, a high-surge lithium polymer battery pack includes three 3.7V, 2666 mAh lithium polymer batteries in a 3S1P configuration. The resulting battery pack provides 11.1V, 2666 Ah (8000 Ah at 3.7V, 29.6 Wh). Continuous discharge current is 25 C (or 200 amps), and burst discharge current is 50 C (or 400 amps). The maximum charging current of the battery pack is 8000 mA (8 amps).

A programmable microcontroller unit (MCU) 1 receives various inputs and produces informational as well as control outputs. The programmable MCU 1 further provides flexibility to the system by allowing updates in functionality and system parameters, without requiring any change in hardware. According to one example embodiment, an 8 bit microcontroller with 2K×15 bits of flash memory is used to control the system. One such microcontroller is the HT67F30, which is commercially available from Holtek Semiconductor Inc.

A car battery reverse sensor 10 monitors the polarity of the vehicle battery 72 when the handheld battery booster device is connected to the vehicle's electric system. As explained below, the booster device prevents the lithium battery pack from being connected to the vehicle battery 72 when the terminals of the battery 72 are connected to the wrong terminals of the booster device. A car battery isolation sensor 12 detects whether or not a vehicle battery 72 is connected to the booster device, and prevents the lithium battery pack from being connected to the output terminals of the booster device unless there is a good (e.g. chargeable) battery connected to the output terminals.

A smart switch FET circuit 15 electrically switches the handheld battery booster lithium battery to the vehicle's electric system only when the vehicle battery is determined by the MCU 1 to be present (in response to a detection signal provided by isolation sensor 12) and connected with the correct polarity (in response to a detection signal provided by reverse sensor 10). A lithium battery temperature sensor 20 monitors the temperature of the lithium battery pack 32 to detect overheating due to high ambient temperature conditions and overextended current draw during jump starting. A lithium battery voltage measurement circuit 24 monitors the voltage of the lithium battery pack 32 to prevent the voltage potential from rising too high during a charging operation and from dropping too low during a discharge operation.

Lithium battery back-charge protection diodes 28 prevent any charge current being delivered to the vehicle battery 72 from flowing back to the lithium battery pack 32 from the vehicle's electrical system. Flashlight LED circuit 36 is provided to furnish a flashlight function for enhancing light under a vehicle's hood in dark conditions, as well as providing SOS and strobe lighting functions for safety purposes when a vehicle may be disabled in a potentially dangerous location. Voltage regulator 42 provides regulation of internal operating voltage for the microcontroller and sensors. On/Off manual mode and flashlight switches 46 allow the user to control power-on for the handheld battery booster device, to control manual override operation if the vehicle has no battery, and to control the flashlight function. The manual button functions only when the booster device is powered on. This button allows the user to jump-start vehicles that have either a missing battery, or the battery voltage is so low that automatic detection by the MCU is not possible. When the user presses and holds the manual override button for a predetermined period time (such as three seconds) to prevent inadvertent actuation of the manual mode, the internal lithium ion battery power is switched to the vehicle battery connect port. The only exception to the manual override is if the car battery is connected in reverse. If the car battery is connected in reverse, the internal lithium battery power shall never be switched to the vehicle battery connect port.

Figure 9A:
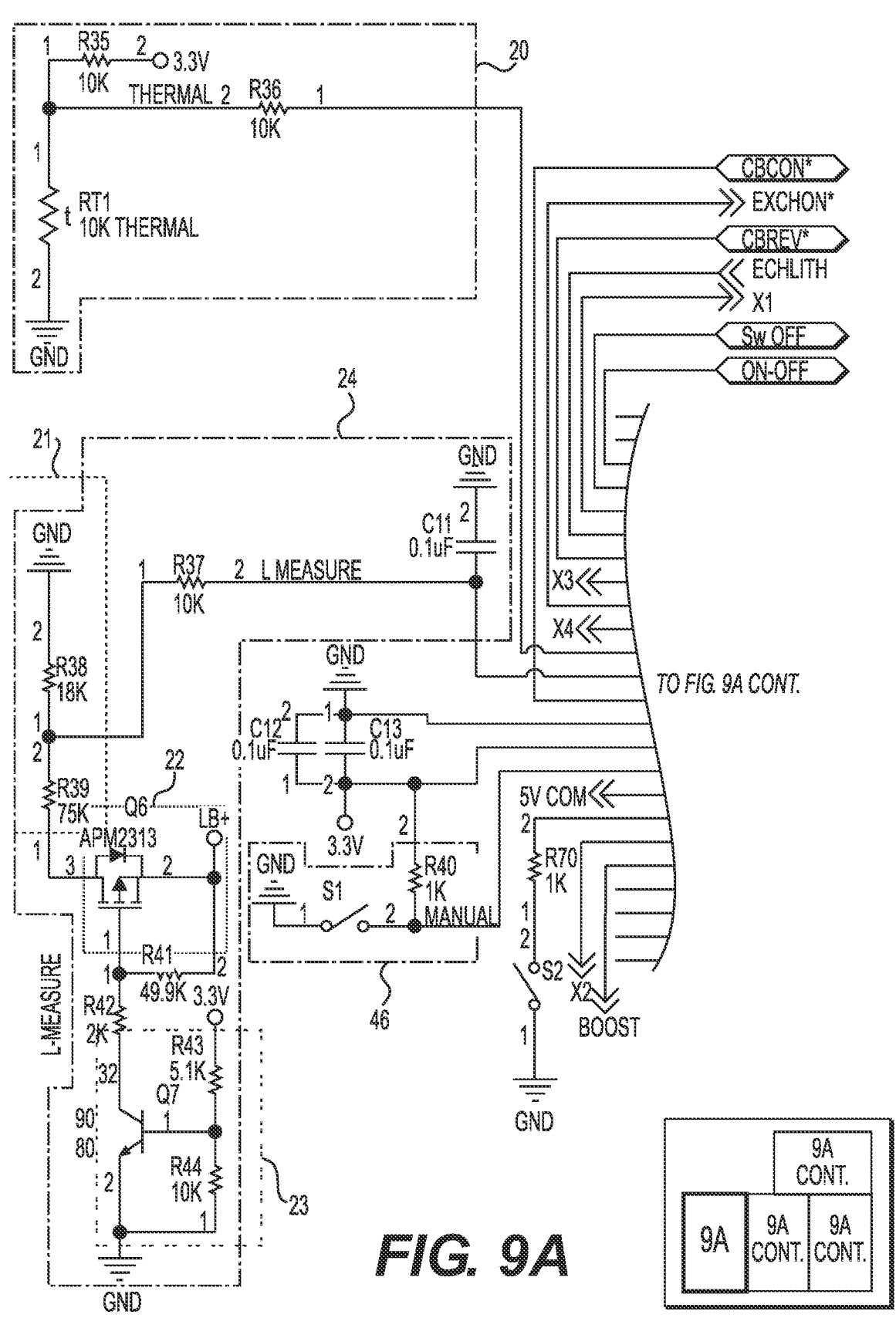
FIG. 9 (FIGS. 9A-9C) is schematic circuit diagrams of an exemplary embodiment of the battery charging device shown in FIG. 6.
Figure 9A:
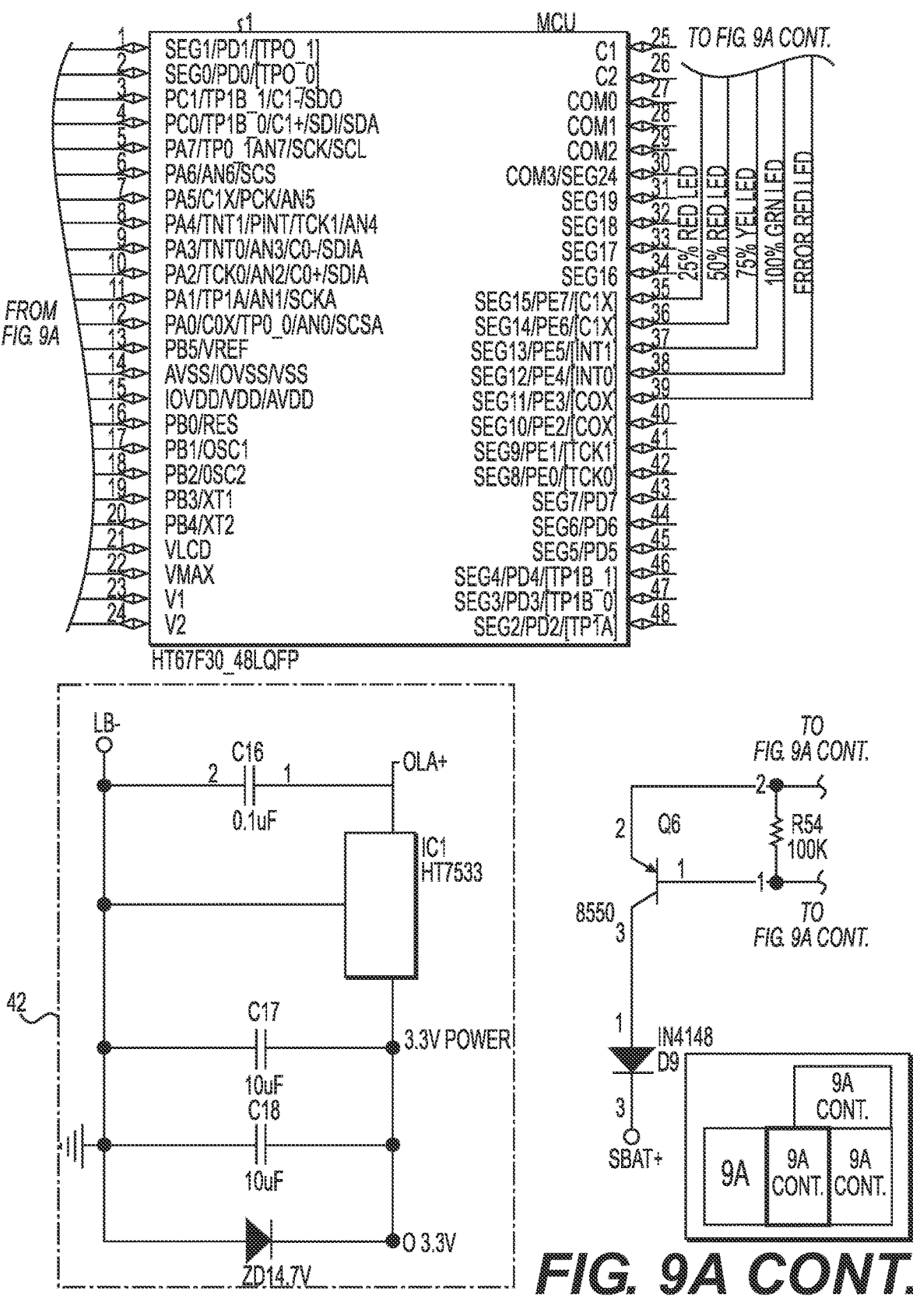
Figure 9A:
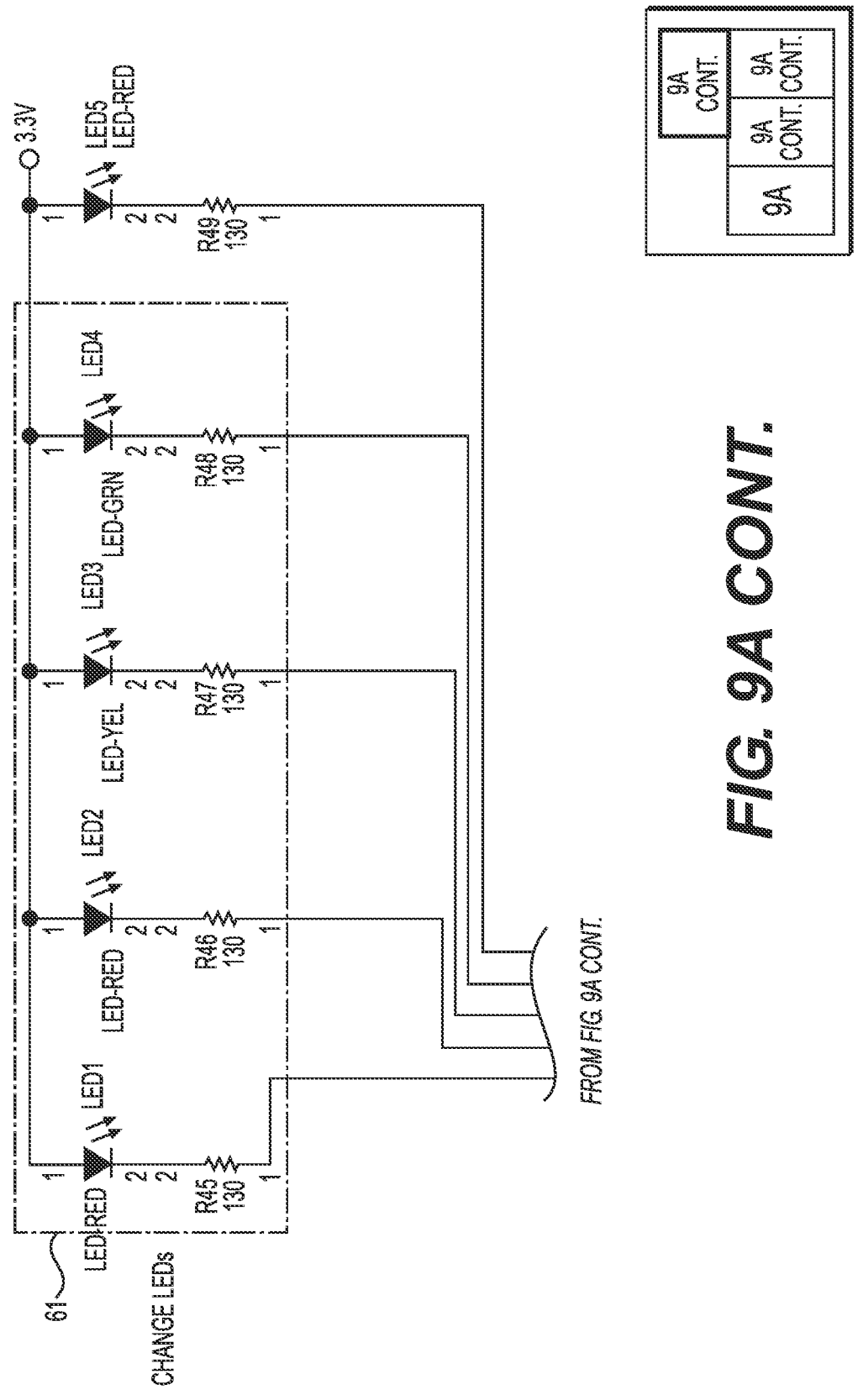
Figure 9A:
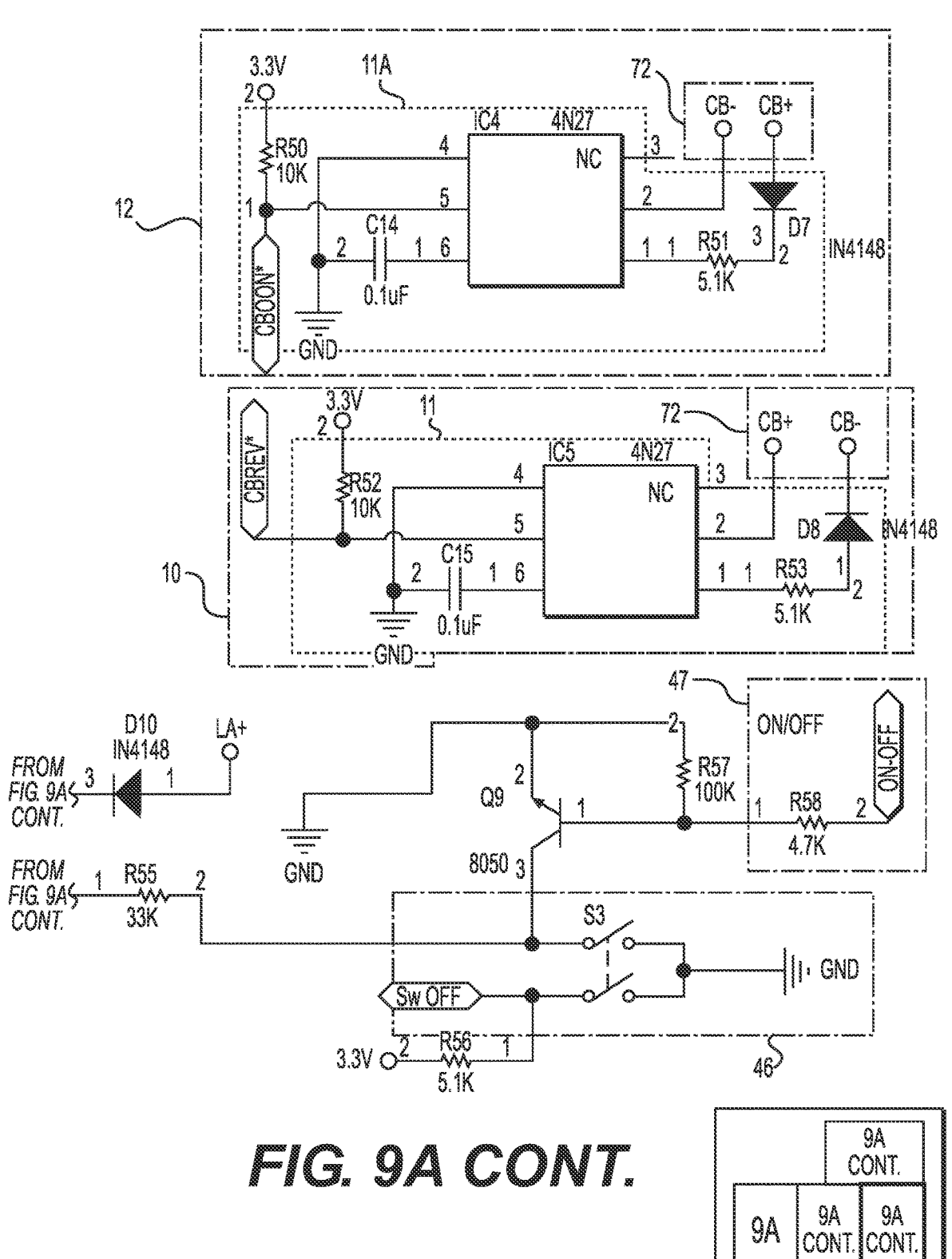

USB charge circuit 52 converts power from any USB charger power source, to charge voltage and current for charging the lithium battery pack 32. USB output 56 provides a USB portable charger for charging smartphones, tablets, and other rechargeable electronic devices. Operation indicator LEDs 60 provide visual indication of lithium battery capacity status as well as an indication of smart switch activation status (indicating that power is being provided to the vehicle's electrical system). Detailed operation of the handheld booster device will now be described with reference to the schematic diagrams of FIGS. 9A-9C. As shown in FIG. 9A, the microcontroller unit 1 is the center of all inputs and outputs. The reverse battery sensor 10 comprises an optically coupled isolator phototransistor (4N27) connected to the terminals of vehicle battery 72 at input pins 1 and 2 with a diode D8 in the lead conductor of pin 1 (associated with the negative terminal CB−), such that if the battery 72 is connected to the terminals of the booster device with the correct polarity, the optocoupler LED 11 will not conduct current, and is therefore turned off, providing a "1" or high output signal to the MCU 1. The car battery isolation sensor 12 comprises an optically coupled isolator phototransistor (4N27) connected to the terminals of vehicle battery 72 at input pins 1 and 2 with a diode D7 in the lead conductor of pin 1 (associated with the positive terminal CB+), such that if the battery 72 is connected to the terminals of the booster device with the correct polarity, the optocoupler LED 11A will conduct current, and is therefore turned on, providing a "0" or low output signal to the MCU, indicating the presence of a battery across the jumper output terminals of the handheld booster device.

If the car battery 72 is connected to the handheld booster device with reverse polarity, the optocoupler LED 11 of the reverse sensor 10 will conduct current, providing a "0" or low signal to microcontroller unit 1. Further, if no battery is connected to the handheld booster device, the optocoupler LED 11A of the isolation sensor 12 will not conduct current, and is therefore turned off, providing a "1" or high output signal to the MCU, indicating the absence of any battery connected to the handheld booster device. Using these specific inputs, the microcontroller software of MCU 1 can determine when it is safe to turn on the smart switch FET 15, thereby connecting the lithium battery pack to the jumper terminals of the booster device. Consequently, if the car battery 72 either is not connected to the booster device at all, or is connected with reverse polarity, the MCU 1 can keep the smart switch FET 15 from being turned on, thus prevent sparking/short circuiting of the lithium battery pack.

Figure 9B:
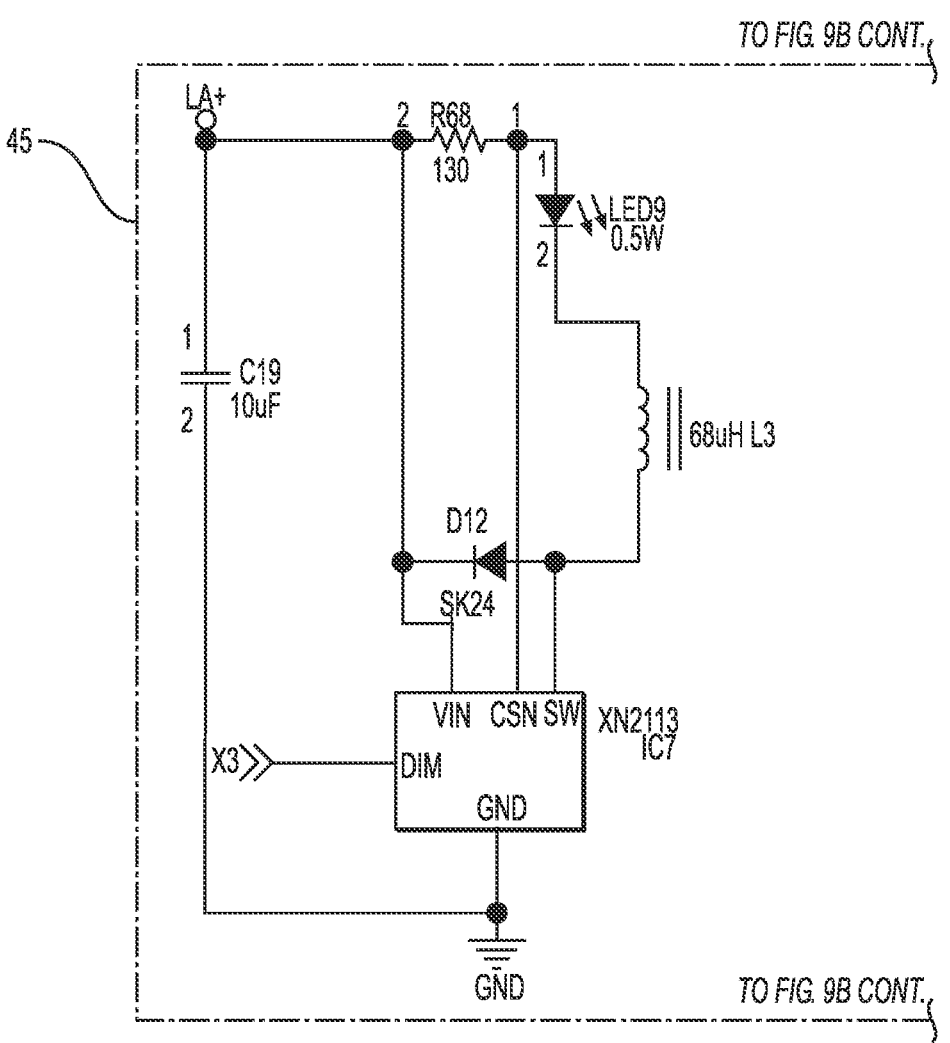
Figure 9B:
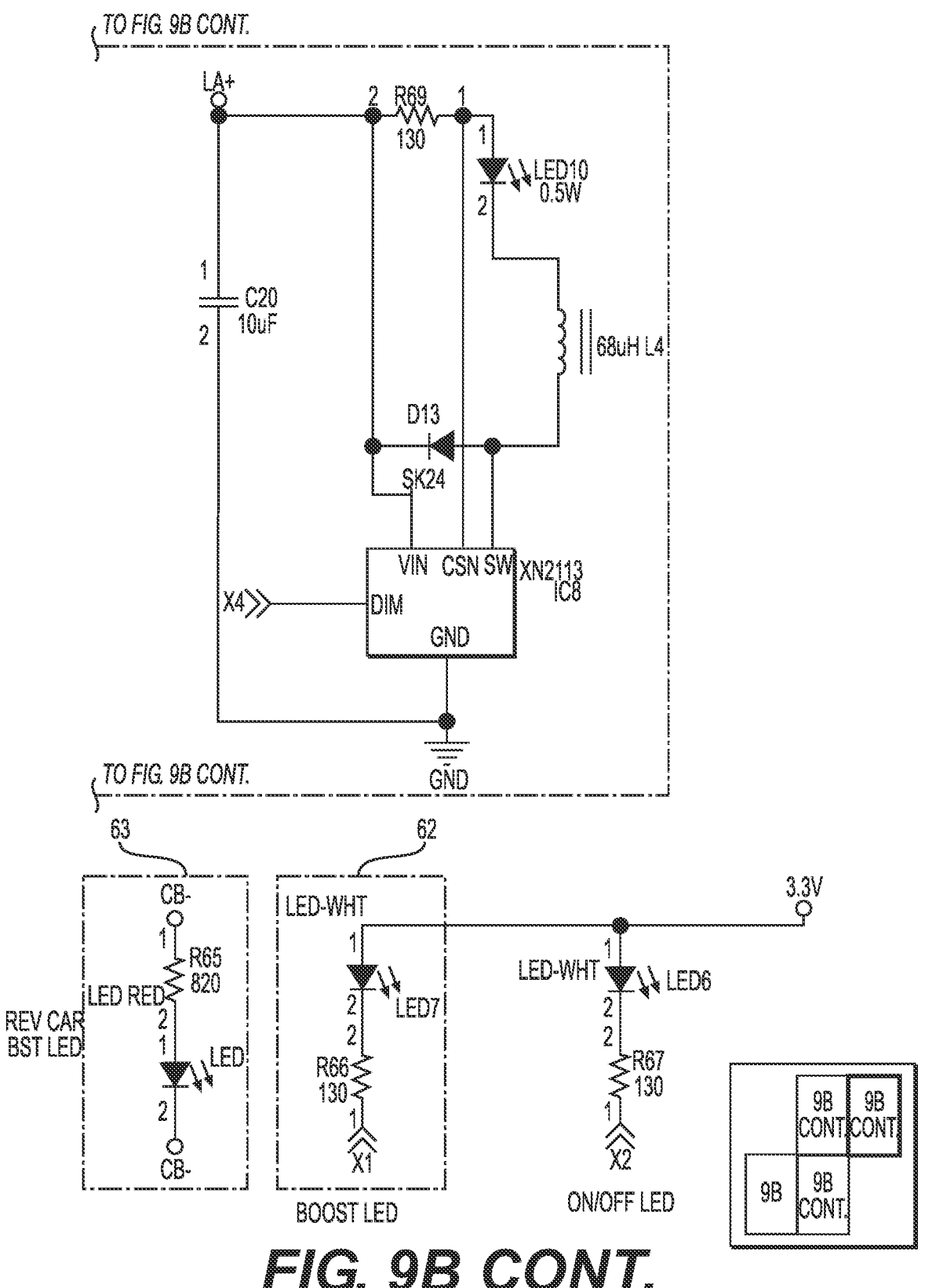
Figure 9C:
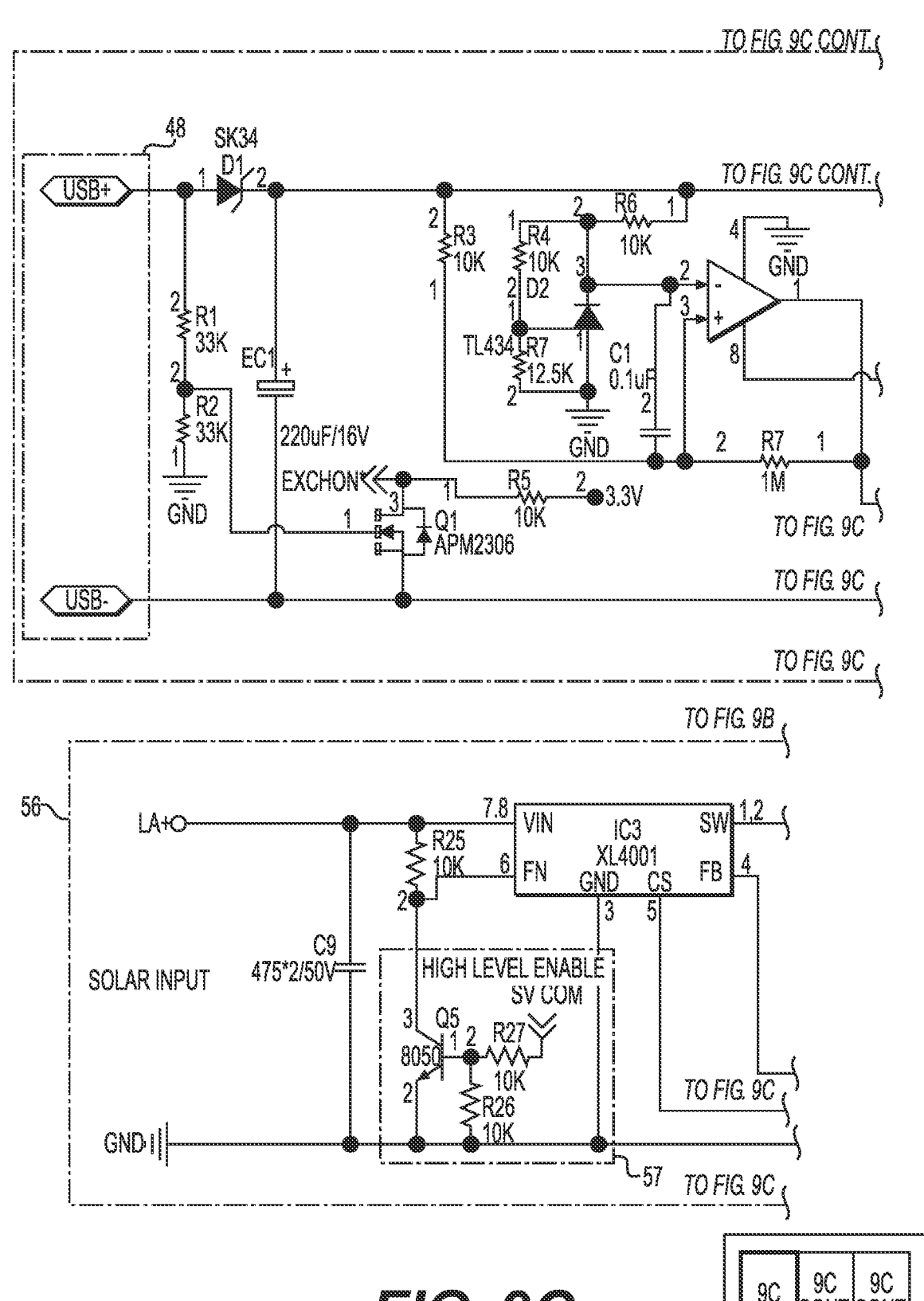
Figure 9C:
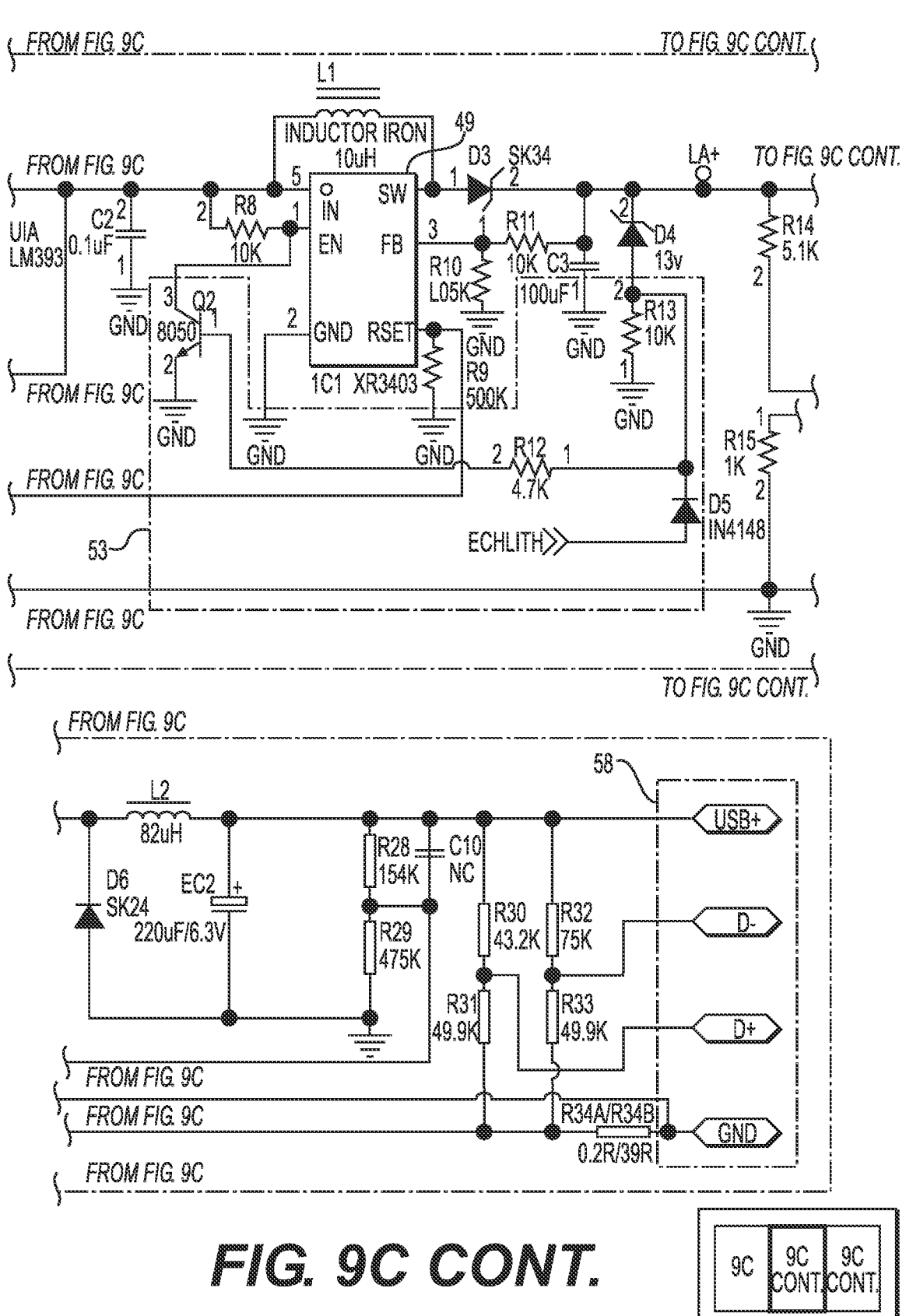

As shown in FIG. 9B, the FET smart switch 15 is driven by an output of the microcontroller 1. The FET smart switch 15 includes three FETs (Q15, Q18, and Q19) in parallel, which spreads the distribution of power from the lithium battery pack over the FETs. When that microcontroller output is driven to a logic low, FETs 16 are all in a high resistance state, therefore not allowing current to flow from the internal lithium battery negative contact 17 to the car battery 72 negative contact. When the microcontroller output is driven to a logic high, the FETs 16 (Q15, Q18, and Q19) are in a low resistant state, allowing current to flow freely from the internal lithium battery pack negative contact 17 (LB−) to the car battery 72 negative contact (CB−). In this way, the microcontroller software controls the connection of the internal lithium battery pack 32 to the vehicle battery 72 for jumpstarting the car engine. Referring back to FIG. 2A, the internal lithium battery pack voltage can be accurately measured using circuit 24 and one of the analog-to-digital inputs of the microcontroller 1. Circuit 24 is designed to sense when the main 3.3V regulator 42 voltage is on, and to turn on transistor 23 when the voltage of regulator 42 is on. When transistor 23 is conducting, it turns on FET 22, thereby providing positive contact (LB+) of the internal lithium battery a conductive path to voltage divider 21 allowing a lower voltage range to be brought to the microcontroller to be read. Using this input, the microcontroller software can determine if the lithium battery voltage is too low during discharge operation or too high during charge operation, and take appropriate action to prevent damage to electronic components.

Still referring to FIG. 9A, the temperature of the internal lithium battery pack 32 can be accurately measured by two negative temperature coefficient (NTC) devices 20. These are devices that reduce their resistance when their temperature rises. The circuit is a voltage divider that brings the result to two analog-to-digital (A/D) inputs on the microcontroller 1. The microcontroller software can then determine when the internal lithium battery is too hot to allow jumpstarting, adding safety to the design. The main voltage regulator circuit 42 is designed to convert internal lithium battery voltage to a regulated 3.3 volts that is utilized by the microcontroller 1 as well as by other components of the booster device for internal operating power. Three lithium battery back charge protection diodes 28 (see FIG. 9B) are in place to allow current to flow only from the internal lithium battery pack 32 to the car battery 72, and not from the car battery to the internal lithium battery. In this way, if the car electrical system is charging from its alternator, it cannot back-charge (and thereby damage) the internal lithium battery, providing another level of safety. The main power on switch 46 (FIG. 9A) is a combination that allows for double pole, double throw operation so that with one push, the product can be turned on if it is in the off state, or turned off if it is in the on state. This circuit also uses a microcontroller output 47 to "keep alive" the power when it is activated by the on switch. When the switch is pressed the microcontroller turns this output to a high logic level to keep power on when the switch is released. In this way, the microcontroller maintains control of when the power is turned off when the on/off switch is activated again or when the lithium battery voltage is getting too low. The microcontroller software also includes a timer that turns the power off after a predefined period of time, (such as, e.g. 8 hours) if not used. The flashlight LED circuit 45 shown in FIG. 9B controls the operation of flashlight LEDs. Two outputs from the microcontroller 1 are dedicated to two separate LEDs. Thus, the LEDs can be independently software-controlled for strobe and SOS patterns, providing yet another safety feature to the booster device. LED indicators provide the feedback the operator needs to understand what is happening with the product. Four separate LEDs 61 (FIG. 9A) are controlled by corresponding individual outputs of microcontroller 1 to provide indication of the remaining capacity of the internal lithium battery. These LEDs are controlled in a "fuel gauge" type format with 25%, 50% 75% and 100% (red, red, yellow, green) capacity indications. An LED indicator 63 (FIG. 9B) provides a visual warning to the user when the vehicle battery 72 has been connected in reverse polarity. "Boost" and on/off LEDs 62 provide visual indications when the booster device is provide jump-start power, and when the booster device is turned on, respectively.

A USB output 56 circuit (FIG. 9C) is included to provide a USB output for charging portable electronic devices such as smartphones from the internal lithium battery pack 32. Control circuit 57 from the microcontroller 1 allows the USB Out 56 to be turned on and off by software control to prevent the internal lithium battery getting too low in capacity. The USB output is brought to the outside of the device on a standard USB connector 58, which includes the standard voltage divider required for enabling charge to certain smartphones that require it. The USB charge circuit 52 allows the internal lithium battery pack 32 to be charged using a standard USB charger. This charge input uses a standard micro-USB connector 48 allowing standard cables to be used. The 5V potential provided from standard USB chargers is up-converted to the 12.4 VDC voltage required for charging the internal lithium battery pack using a DC-DC converter 49. The DC-DC converter 49 can be turned on and off via circuit 53 by an output from the microcontroller 1.

In this way, the microcontroller software can turn the charge off if the battery voltage is measured to be too high by the A/D input 22. Additional safety is provided for helping to eliminate overcharge to the internal lithium battery using a lithium battery charge controller 50 that provides charge balance to the internal lithium battery cells 51. This controller also provides safety redundancy for eliminating over discharge of the internal lithium battery.

Figure 10:
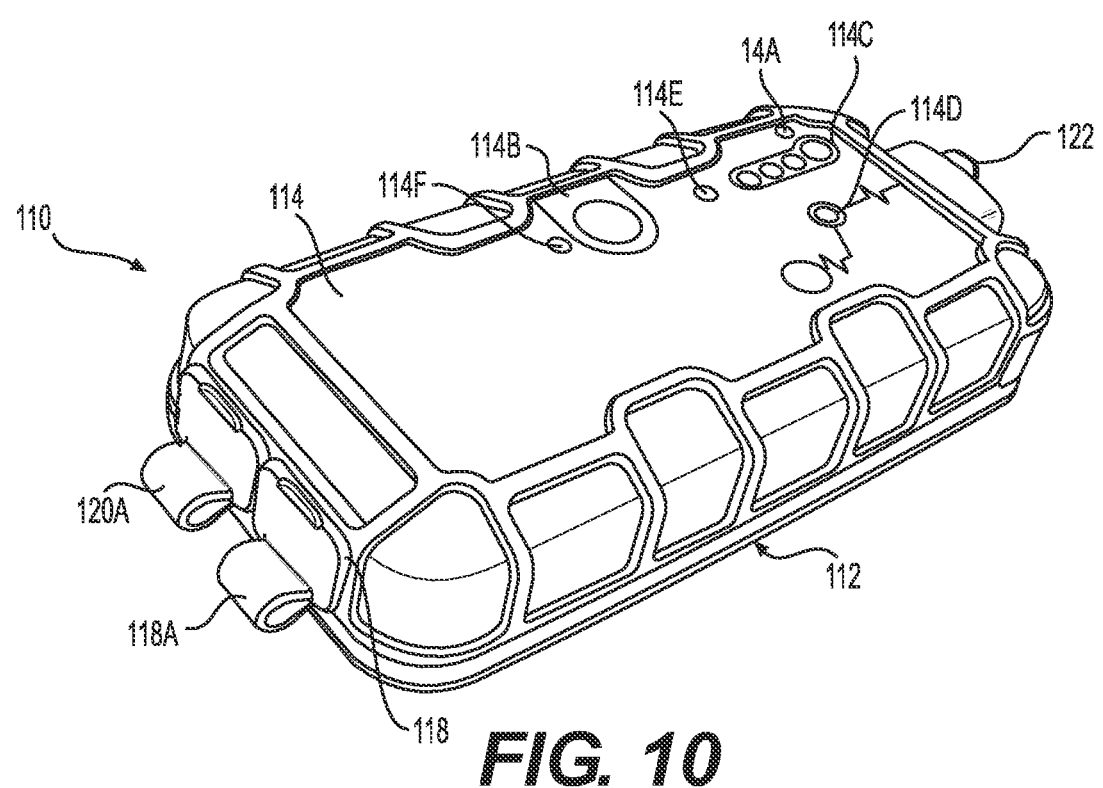
FIG. 10 is a perspective view of the battery charging device shown in FIG. 6 showing the various features of the display.

FIG. 10 shows a handheld device 110 in accordance with an exemplary embodiment of the invention. 112 is a casing. 114 is a display. 114A is a power on switch. 114B is an LED "fuel gauge" indicators. 114C is a "boost on" indicator for showing that power is being provided to the 12V output port 122. 114D is a "reverse" indicator for showing that the vehicle battery is improperly connected with respect to polarity. 114E is a "power on" indicator for showing that the device is powered up for operation. 118 is a USB input port for charging the internal lithium ion battery. 118A is a removable cover for the USB input port 118. 120 is a USB output port for providing power from the internal lithium ion battery to other portable devices such as a smart phone, tablet, music player, and other electronic devices. 120A is a removable cover for the USB output port 120. 122 is a 12V output port connectable to a cable device 210 described below.

Figure 11:
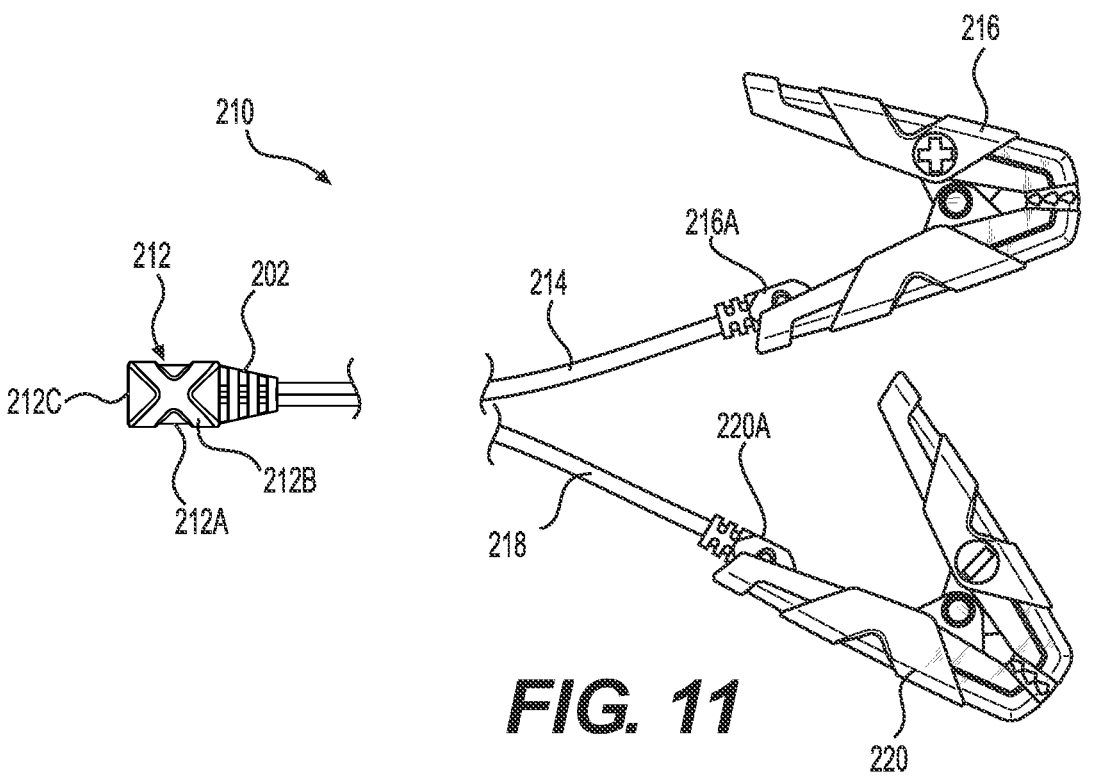
FIG. 11 is a top planar view of a battery cable assembly for use with the battery charging device shown in FIGS. 6-10.

FIG. 11 shows a jumper cable device 210 specifically designed for use with the handheld device 110. The device 210 has a plug 212 configured to plug into the 12V output port 122 of the handheld device 110. A positive battery cable 214 and a negative battery cable 218 are integrated with the plug 212, and are connected, respectively, to the positive battery clamp 216 and negative battery clamp 220 via ring connectors 216A and 220A, respectively. The 12V outlet port 122 and plug 212 are dimensioned so that the plug 212 will only fit into the 12V outlet port 122 in a specific orientation, thus ensuring that positive battery clamp 216 will correspond to positive polarity, and the negative battery clamp 220 will correspond to negative polarity, as indicated thereon.

Additionally, the ring terminals 216A and 216B allows the battery clamps 216 and 229 to be disconnected from the battery cables 214 and 218, and then removably connected directly to the terminals of a vehicle battery. This feature may be useful, for example, to permanently attach the battery cables 214 and 218 to the battery of the vehicle. In the event that the battery voltage becomes depleted or discharged, the handheld booster device 110 can be properly connected to the depleted or discharged vehicle battery very simply by plugging in the plug 212 into the 12V outlet port 122.

The invention having been thus described, it will be apparent to those skilled in the art that the same may be varied in many ways without departing from the spirit or scope of the invention. Any and all such variations are intended to be encompassed within the scope of the following claims.

The invention claimed is:

1. A method of charging a deeply discharged battery using a battery charging device, the method comprising:

determining that an output voltage of the deeply discharged battery is at or near zero volts;

based on the determination that the output voltage of the deeply discharged battery is at or near zero volts, preventing the battery charging device from all charging of the deeply discharged battery with a low-voltage safety check that prevents the battery charging device from any charging of the deeply discharged battery when no battery voltage is detected;

receiving a user input;

based on the user input and the determination that the output voltage of the deeply discharged battery is at or near zero volts, allowing the battery charging device to enter a force mode; and while in the force mode, charging the deeply discharged battery using the battery charging device, by-passing the low-voltage safety check.

2. The method according to claim 1, wherein the deeply discharged battery is charged by the battery charging device in the force mode for a predetermined amount of time.

3. The method according to claim 2, wherein the predetermined amount of time is five (5) minutes.

4. The method according to claim 2, wherein the charging of the deeply discharged battery in force mode is terminated upon reaching the predetermined amount of time.

5. The method according to claim 4, further comprising measuring the deeply discharged battery output voltage after the force mode is terminated.

6. The method according to claim 5, wherein if the deeply discharged battery output voltage is above a normal starting voltage threshold after the force mode is terminated and the deeply discharged battery output voltage is measured, the rechargeable battery charging device will begin charging in a normal mode.

7. The method according to claim 6, wherein if the deeply discharged battery output voltage is too low after the force mode is terminated and the deeply discharged battery output voltage is measured, then the rechargeable battery charging device will return to a standby or off mode.

8. The method according to claim 1, wherein the deeply discharged battery is a lead-acid battery.

9. The method according to claim 1, wherein the deeply discharged battery is an over-discharge lithium ion battery with an open battery management system (BMS).

10. A rechargeable battery charging device for charging a deeply discharged battery, the device comprising:

a rechargeable battery having a positive terminal and a negative terminal;

a positive battery cable connected or connectable to the positive terminal of the rechargeable battery;

a negative battery cable connected or connectable to the negative terminal of the rechargeable battery;

a detector for measuring an output voltage of the deeply discharged battery;

a programmable microcontroller unit (MCI) connected to one or more components or parts of the rechargeable battery charging device, the MCI structured and arranged to control operation of the rechargeable battery charging device;

a user interface connected to the MCI, the user interface structured and arranged to display one or more functions or modes of the rechargeable battery charging device; and a controller structured and arranged to control the charging of the deeply discharged battery, the controller being configured to, determine that an output voltage of the deeply discharged battery is at or near zero volts;

based on the determination that the output voltage of the deeply discharged battery is at or near zero volts, prevent the battery charging device from all charging of the deeply discharged battery with a low-voltage safety check that prevents the battery charging device from any charging of the deeply discharged battery when no battery voltage is detected;

receive a user input;

based on the user input and the determination that the output voltage of the deeply discharged battery is at or near zero volts, allow the battery charging device to enter a force mode, and while in force mode, charge the deeply discharged battery, by-passing the low-voltage safety check.

11. The device according to claim 10, wherein the force mode is configured to operate for a predetermined period of time.

12. The device according to claim 11, wherein the predetermined period of time is five minutes.

13. The device according to claim 11, wherein after the force mode is terminated due to expiration of the predetermined period of time, the rechargeable battery charging device will measure the deeply discharged battery voltage.

14. The device according to claim 13, wherein if the deeply discharged battery is above a normal starting voltage threshold, the rechargeable battery charging device will begin charging in a normal mode.

15. The device according to claim 13, wherein if the deeply discharged battery voltage is too low, then the rechargeable battery charging device will return to a standby or off mode.

16. The device according to claim 10 wherein the user interface is structured and arranged to allow a user to select the force mode.

17. The device according to claim 16, wherein the user interface is configured to provide user feedback if the rechargeable battery charging device is in the force mode.

18. The device according to claim 17, wherein the user feedback is provided by lighting a light emitting diode (LED).

19. The device according to claim 10, wherein the deeply discharged battery is a lead-acid battery.

20. The device according to claim 10, wherein the deeply discharged battery is an over-discharged lithium ion battery with an open battery management system (BMS).

21. A method of charging a deeply discharged battery using a battery charging device, the method comprising:

determining that an output voltage of the deeply discharged battery is less than a predetermined threshold voltage;

based on the determination that the output voltage of the deeply discharged battery is less than the predetermined threshold voltage, preventing the battery charging device from all charging of the deeply discharged battery with a low-voltage safety check that prevents the battery charging device from any charging of the deeply discharged battery when no battery voltage is detected;

receiving a user input;

based on the user input and the determination that the output voltage of the deeply discharged battery is less than the predetermined threshold voltage, allowing the battery charging device to charge the deeply discharged battery, bypassing the low-voltage safety check.

22. The method of claim 21, wherein the user input is a button press.

23. The method of claim 22, wherein the button press lasts for at least five seconds.

24. The method of claim 23, wherein the predetermined threshold voltage is one volt.

25. The method of claim 21, further comprising displaying one or more functions or modes of the battery charging device on a user interface.

26. The method of claim 21, wherein the deeply discharged battery is charged for a predetermined amount of time.

27. The method of claim 26, wherein the predetermined amount of time is five minutes.

28. The method of claim 26, wherein the charging of the deeply discharged battery is terminated upon reaching the predetermined amount of time.

29. The method of claim 28, further comprising measuring the output voltage of the deeply discharged battery after the charging of the deeply discharged battery is terminated.

30. The method of claim 29, wherein if the output voltage of the deeply discharged battery is above a second predetermined threshold voltage after the charging of the deeply discharged battery is terminated, the battery charging device begins charging the deeply discharged battery without bypassing the low-voltage safety check.

31. The method of claim 30, wherein if the output voltage of the deeply discharged battery is below the second predetermined threshold voltage after the charging of the deeply discharged battery is terminated, the battery charging device returns to a standby or off mode.

32. The method of claim 21, wherein the deeply discharged battery is a lead-acid battery.

33. The method of claim 21, wherein the deeply discharged battery is a lithium-ion battery with an open battery management system (BMS).

34. The method of claim 21, further comprising determining whether the deeply discharged battery is connected to the battery charging device with a proper polarity.

35. A rechargeable battery charging device for charging a deeply discharged battery, the device comprising:

a rechargeable battery having a positive terminal and a negative terminal;

a positive battery cable connected or connectable to the positive terminal of the rechargeable battery;

a negative battery cable connected or connectable to the negative terminal of the rechargeable battery;

a detector for measuring an output voltage of the deeply discharged battery;

a programmable microcontroller unit (MCI) connected to one or more components of the rechargeable battery charging device, the MCI configured to control operation of the rechargeable battery charging device; and a controller structured and arranged to control the charging of the deeply discharged battery, the controller being configured to:

determine that an output voltage of the deeply discharged battery is less than a predetermined threshold voltage;

based on the determination that the output voltage of the deeply discharged battery is less than the predetermined threshold voltage, prevent the battery charging device from all charging of the deeply discharged battery with a low-voltage safety check that prevents the battery charging device from any charging of the deeply discharged battery when no battery voltage is detected;

receive a user input;

based on the user input and the determination that the output voltage of the deeply discharged battery is less than the predetermined threshold voltage, allow the rechargeable battery charging device to charge the deeply discharged battery, bypassing the low-voltage safety check.

36. The rechargeable battery charging device of claim 35, wherein the user input is a button press.

37. The rechargeable battery charging device of claim 36, wherein the button press lasts for at least five seconds.

38. The rechargeable battery charging device of claim 37, wherein the predetermined threshold voltage is one volt.

39. The rechargeable battery charging device of claim 35, further comprising a user interface connected to the MCI, the user interface configured to display one or more functions or modes of the rechargeable battery charging device.

40. The rechargeable battery charging device of claim 35, wherein the deeply discharged battery is charged for a predetermined amount of time.

41. The rechargeable battery charging device of claim 40, wherein the predetermined amount of time is five minutes.

42. The rechargeable battery charging device of claim 40, wherein the controller is further configured to terminate the charging of the deeply discharged battery upon reaching the predetermined amount of time.

43. The rechargeable battery charging device of claim 42, wherein the controller is further configured to measure the output voltage of the deeply discharged battery after the charging of the deeply discharged battery is terminated.

44. The rechargeable battery charging device of claim 43, wherein if the output voltage of the deeply discharged battery is above a second predetermined threshold voltage after the charging of the deeply discharged battery is terminated, the rechargeable battery charging device begins charging the deeply discharged battery without bypassing the low-voltage safety check.

45. The rechargeable battery charging device of claim 44, wherein if the output voltage of the deeply discharged battery is below the second predetermined threshold voltage after the charging of the deeply discharged battery is terminated, the rechargeable battery charging device returns to a standby or off mode.

46. The rechargeable battery charging device of claim 35, wherein the deeply discharged battery is a lead-acid battery.

47. The rechargeable battery charging device of claim 35, wherein the deeply discharged battery is a lithium-ion battery with an open battery management system (BMS).

48. The rechargeable battery charging device of claim 35, wherein the controller is further configured to determine whether the deeply discharged battery is connected to the rechargeable battery charging device with the proper polarity.

49. A method of charging a deeply discharged battery using a battery charging device, the method comprising:

based on an output voltage of the deeply discharged battery being less than a predetermined threshold voltage, preventing the battery charging device from any charging of the deeply discharged battery with a low-voltage safety check that prevents the battery charging device from any charging of the deeply discharged battery when no battery voltage is detected;

receiving a user input;

in response to the user input and the output voltage of the deeply discharged battery being less than the predetermined threshold voltage, charging the deeply discharged battery, bypassing the low-voltage safety check.

50. The method of claim 49, wherein the predetermined threshold voltage is one volt.

51. The method of claim 49, further comprising displaying one or more functions or modes of the battery charging device on a user interface.

52. The method of claim 49, wherein the deeply discharged battery is charged for a predetermined amount of time.

53. The method of claim 52, wherein the predetermined amount of time is five minutes.

54. The method of claim 52, wherein the charging of the deeply discharged battery is terminated upon reaching the predetermined amount of time.

55. The method of claim 54, further comprising measuring the output voltage of the deeply discharged battery after the charging of the deeply discharged battery is terminated.

56. The method of claim 55, wherein if the output voltage of the deeply discharged battery is above a second predetermined threshold voltage after the charging of the deeply discharged battery is terminated, the battery charging device begins charging the deeply discharged battery without bypassing the low-voltage safety check.

57. The method of claim 56, wherein if the output voltage of the deeply discharged battery is below the second predetermined threshold voltage after the charging of the deeply discharged battery is terminated, the battery charging device returns to a standby or off mode.

58. The method of claim 49, wherein the deeply discharged battery is a lead-acid battery.

59. The method of claim 49, wherein the deeply discharged battery is a lithium-ion battery with an open battery management system (BMS).

60. A method of charging a deeply discharged battery using a battery charging device, the method comprising:

determining that an output voltage of the deeply discharged battery is less than one volt;

based on the determination that the output voltage of the deeply discharged battery is less than one volt, preventing the battery charging device from all charging of the deeply discharged battery with a low-voltage safety check that prevents the battery charging device from any charging of the deeply discharged battery when no battery voltage is detected;

receiving a user input including a button press of at least five seconds;

based on the user input and the determination that the output voltage of the deeply discharged battery is less than one volt, allowing the battery charging device to enter a force mode; and while in the force mode, charging the deeply discharged battery using the battery charging device, bypassing the low-voltage safety check.

61. The method of claim 60, further comprising displaying one or more functions or modes of the battery charging device on a user interface.

62. The method of claim 60, wherein the deeply discharged battery is charged for a predetermined amount of time.

63. The method of claim 62, wherein the predetermined amount of time is five minutes.

64. The method of claim 62, wherein the charging of the deeply discharged battery is terminated upon reaching the predetermined amount of time.

65. The method of claim 64, further comprising measuring the output voltage of the deeply discharged battery after the charging of the deeply discharged battery is terminated.

66. The method of claim 65, wherein if the output voltage of the deeply discharged battery is above a predetermined threshold voltage after the charging of the deeply discharged battery is terminated, the battery charging device begins charging the deeply discharged battery without bypassing the low-voltage safety check.

67. The method of claim 66, wherein if the output voltage of the deeply discharged battery is below the predetermined threshold voltage after the charging of the deeply discharged battery is terminated, the battery charging device returns to a standby or off mode.

68. The method of claim 60, wherein the deeply discharged battery is a lead-acid battery.

69. The method of claim 60, wherein the deeply discharged battery is a lithium-ion battery with an open battery management system (BMS).

70. The method of claim 60, further comprising determining whether the deeply discharged battery is connected to the battery charging device with a proper polarity.

* * * * *